United States Patent
Haile et al.

(10) Patent No.: US 12,021,246 B2
(45) Date of Patent: Jun. 25, 2024

(54) METHODS OF FORMING BILAYER CATHODES FOR ELECTROCHEMICAL CELLS

(71) Applicants: Northwestern University, Evanston, IL (US); University of Maryland, College Park, College Park, MD (US)

(72) Inventors: Sossina M. Haile, Evanston, IL (US); Sihyuk Choi, Evanston, IL (US); Christopher James Kucharczyk, Evanston, IL (US); Yangang Liang, Richland, WA (US); Xiaohang Zhang, North Potomac, MD (US); Ichiro Takeuchi, Laurel, MD (US)

(73) Assignees: Northwestern University, Evanston, IL (US); University of Maryland, College Park, College Park, MD (US)

( * ) Notice: Subject to any disclaimer, the term of this patent is extended or adjusted under 35 U.S.C. 154(b) by 0 days.

(21) Appl. No.: 17/985,218

(22) Filed: Nov. 11, 2022

(65) Prior Publication Data
US 2023/0077350 A1 Mar. 16, 2023

Related U.S. Application Data

(62) Division of application No. 16/754,575, filed as application No. PCT/US2018/055987 on Oct. 16, 2018, now abandoned.
(Continued)

(51) Int. Cl.
*H01M 4/90* (2006.01)
*C01G 25/00* (2006.01)
(Continued)

(52) U.S. Cl.
CPC ........ *H01M 4/9033* (2013.01); *C01G 25/006* (2013.01); *C01G 25/02* (2013.01); *H01M 4/861* (2013.01); *H01M 4/8657* (2013.01); *H01M 4/881* (2013.01); *H01M 4/8828* (2013.01); *H01M 4/8867* (2013.01);
(Continued)

(58) Field of Classification Search
CPC .......................... H01M 4/861; H01M 4/4881
See application file for complete search history.

(56) References Cited

U.S. PATENT DOCUMENTS

| 5,308,712 A * | 5/1994 | Seike | H01M 4/9033 |
| | | | 429/481 |
| 2007/0238007 A1* | 10/2007 | Katagiri | H01M 8/1213 |
| | | | 264/618 |

(Continued)

OTHER PUBLICATIONS

Park, Seonhye et al., "A collaborative study of sintering and composite effects for a PrBa0.5Sr0.5Co1.5Fe0.5O5+delta IT-SOFC cathode," RSC Advances 2014 (4), 1775-1781.*

*Primary Examiner* — Jonathan Crepeau
(74) *Attorney, Agent, or Firm* — Bell & Manning, LLC

(57) ABSTRACT

Materials for electrochemical cells are provided. $BaZr_{0.4}Ce_{0.4}M_{0.2}O_3$ compounds, where M represents one or more rare earth elements, are provided for use as electrolytes. $PrBa_{0.5}Sr_{0.5}Co_{2-x}Fe_xO_{5+\delta}$ is provided for use as a cathode. Also provided are electrochemical cells, such as protonic ceramic fuel cells, incorporating the compounds as electrolytes and cathodes.

11 Claims, 18 Drawing Sheets

Related U.S. Application Data

(60) Provisional application No. 62/572,680, filed on Oct. 16, 2017.

(51) Int. Cl.
| | |
|---|---|
| *C01G 25/02* | (2006.01) |
| *H01M 4/86* | (2006.01) |
| *H01M 4/88* | (2006.01) |
| *H01M 8/1213* | (2016.01) |
| *H01M 8/1246* | (2016.01) |
| *H01M 8/1253* | (2016.01) |
| *H01M 8/126* | (2016.01) |
| *H01M 8/12* | (2016.01) |

(52) U.S. Cl.
CPC ....... *H01M 4/9066* (2013.01); *H01M 8/1213* (2013.01); *H01M 8/1246* (2013.01); *H01M 8/1253* (2013.01); *H01M 8/126* (2013.01); H01M 2008/1293 (2013.01); H01M 2300/0074 (2013.01)

(56) References Cited

U.S. PATENT DOCUMENTS

2008/0044706 A1\* 2/2008 Iijima ................. H01M 4/8885
429/479
2017/0271683 A1\* 9/2017 Pan ..................... H01M 8/1213

\* cited by examiner

METHODS OF FORMING BILAYER CATHODES FOR ELECTROCHEMICAL CELLS

CROSS-REFERENCE TO RELATED APPLICATIONS

The present application is a divisional of U.S. patent application Ser. No.: 16/754,575 filed Apr. 8, 2020, the entire contents of which are hereby incorporated herein by reference; U.S. patent application Ser. No.: 16/754,575 is a National Stage of International Application No. PCT/US2018/055987, filed Oct. 16, 2018, the entire contents of which are hereby incorporated by reference; International Application No.: PCT/US2018/055987 claims priority to U.S. Provisional Patent Application No. 62/572,680, filed Oct. 16, 2017, the entire contents of which are incorporated herein by reference.

REFERENCE TO GOVERNMENT RIGHTS

This invention was made with government support under DE-AR0000498 awarded by the U.S. Department of Energy. The government has certain rights in the invention.

BACKGROUND

Protonic ceramic fuel cells (PCFCs) offer the potential of environmentally sustainable and cost-effective electric power generation, benefits which accrue from the high ionic conductivity of the electrolyte materials at intermediate temperatures (400-600° C.). However, only a handful of studies report peak power densities of PCFCs exceeding even 200 mW cm$^{-2}$ at 500° C. (See, Nguyen, N. T. Q., et al. Preparation and evaluation of $BaZr_{0.1}Ce_{0.7}Y_{0.1}Yb_{0.1}O_{3-\delta}$ (BZCYYb) electrolyte and BZCYYb-based solid oxide fuel cells. *J. Power Sources* 231, 213-218 (2013); Duan, C., et al. Readily processed protonic ceramic fuel cells with high performance at low temperatures. Science 349, 1321-1326 (2015); Nien, S. H., et al. Preparation of $BaZr_{0.1}Ce_{0.7}Y_{0.2}O_{3-\delta}$ Based Solid Oxide Fuel Cells with Anode Functional Layers by Tape Casting. *Fuel Cells* 11, 178-183 (2011); and Bae, K., et al. Demonstrating the potential of yttrium-doped barium zirconate electrolyte for high-performance fuel cells. *Nature Communications* 8, 14553 (2017).)

The poor rate of oxygen electroreduction at the cathode of PCFCs has been recognized as one of the key factors limiting power densities in such fuel cells. (See, Fabbri, E., et al. Materials challenges toward proton-conducting oxide fuel cells: a critical review. *Chemical Society Reviews* 39, 4355-4369 (2010).) Another factor contributing to poor power density is a surprisingly high ohmic resistance of the cells. This behavior is evident in a number of studies. (See, Nien, S. H., et al. Preparation of $BaZr_{0.1}Ce_{0.7}Y_{0.2}O_{3-\delta}$ Based Solid Oxide Fuel Cells with Anode Functional Layers by Tape Casting. *Fuel Cells* 11, 178-183 (2011); Nguyen, N. T. Q., et al. Preparation and evaluation of $BaZr_{0.1}Ce_{0.7}Y_{0.1}Yb_{0.1}O_{3-\delta}$ (BZCYYb) electrolyte and BZCYYb-based solid oxide fuel cells. *J. Power Sources* 231, 213-218 (2013); and Bae, K. et al. Demonstrating the potential of yttrium-doped barium zirconate electrolyte for high-performance fuel cells. *Nature Communications* 8, 14553 (2017).)

In addition to poor power densities, a further challenge in PCFC development lies in the reactivity of many protonic ceramic electrolytes with $CO_2$, precluding their use at intermediate temperatures with carbon containing fuels. (See, Fabbri, E., et al. Materials challenges toward proton-conducting oxide fuel cells: a critical review. *Chemical Society Reviews* 39, 4355-4369 (2010).)

SUMMARY

Materials for protonic ceramic electrochemical cells are provided. Also provided are protonic ceramic electrochemical cells incorporating the materials as electrolytes and cathodes, and methods of making bilayered cathodes for the electrochemical cells.

Barium zirconate compounds having the formula $BaZr_{0.4}Ce_{0.4}M_{0.2}O_3$, where M represents one or more rare earth elements, are provided. Some embodiments of the compounds have the formula $BaZr_{0.4}Ce_{0.4}Y_{0.2-x}Yb_xO_3$, where 0≤x≤0.2, or the formula $BaZr_{0.4}Ce_{0.4}Ho_{0.2}O_3$.

Double perovskite compounds having the formula $PrBa_{0.5}Sr_{0.5}Co_{2-x}Fe_xO_{5+\delta}$, where 0.4≤x≤2, for use as cathodes in electrochemical cells, including protonic ceramic fuel cells, are also provided.

The electrochemical cells comprise: a cathode, an anode, and a solid electrolyte between the anode and the cathode. In some embodiments of the electrochemical cells, the solid electrolyte comprises a barium zirconate compound having the formula $BaZr_{0.4}Ce_{0.4}M_{0.2}O_3$, where M represents one or more rare earth elements. In some embodiments of the electrochemical cells, the cathode comprises $PrBa_{0.5}Sr_{0.5}Co_{1.5}Fe_{0.5}O_{5-\delta}$. In some embodiments of the electrochemical cells, the cathode has a bilayer structure comprising a thin dense interlayer of a cathode material in direct contact with the solid electrolyte and a porous overlayer of the cathode material over the dense interlayer.

One embodiment of the method of creating a bilayer cathode comprises: forming a dense interlayer of the cathode material on the solid electrolyte; forming a porous overlayer of the cathode material on the dense interlayer; and sintering the cathode material. In some embodiments of the bilayered cathodes, the cathode material is $PrBa_{0.5}Sr_{0.5}Co_{1.5}Fe_{0.5}O_{5-\delta}$.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 1A shows an X-ray diffraction (XRD) pattern before and after exposure to 100% $CO_2$ at 500° C. FIG. 1B shows the thermo-gravimetric analysis (TGA) profile upon exposure to 60% $CO_2$ (balance $N_2$) at 500° C. FIG. 1C shows the conductivity under a humidified $N_2$ atmosphere (p$H_2$O=0.031 atm), as compared to that of BZY20 sintered under similar conditions, with the inset showing an SEM image of the as-sintered surface morphology of BZCYYb4411.

FIG. 2A shows thermogravimetric profiles upon cooling in dry and wet air, and the implied proton concentration. FIG. 2B shows the equilibrium constant for the hydration reaction.

FIG. 3A shows a cross-section. FIG. 3B shows an expanded view of the cross-section showing the dense cathode interlayer at the electrolyte-cathode interface. FIG. 3C shows the PBSCF cathode microstructure after sintering at 950° C.

FIG. 4A shows the polarization and power density curves of a representative cell without a dense cathode interlayer. FIG. 4B shows the polarization and power density curves of a representative cell with a dense cathode interlayer. FIG. 4C shows impedance spectra collected at 600° C., showing a dramatic decrease in the offset resistance upon introduction of the cathode interlayer. FIG. 4D depicts the offset (ohmic) resistance under Open Circuit Voltage (OCV). FIG. 4E depicts the electrochemical reaction (arc) resistance under OCV. FIG. 4F shows the temporal evolution of the cell current density and power density under a constant voltage load of 0.5 V at 550° C. in humidified $H_2$.

FIG. 5A shows the offset resistance (largely due to electrolyte). FIG. 5B shows the electrochemical reaction resistance.

FIG. 7A depicts the comparison with BZY20 composition in bulk, grain boundary (gb), and total conductivity. FIG. 7B shows the total conductivities of 20% Y, Yb, and Ho doped barium zirconate-cerate oxide with a 1:1 Zr:Ce molar ratio.

DETAILED DESCRIPTION

Figure 1A:
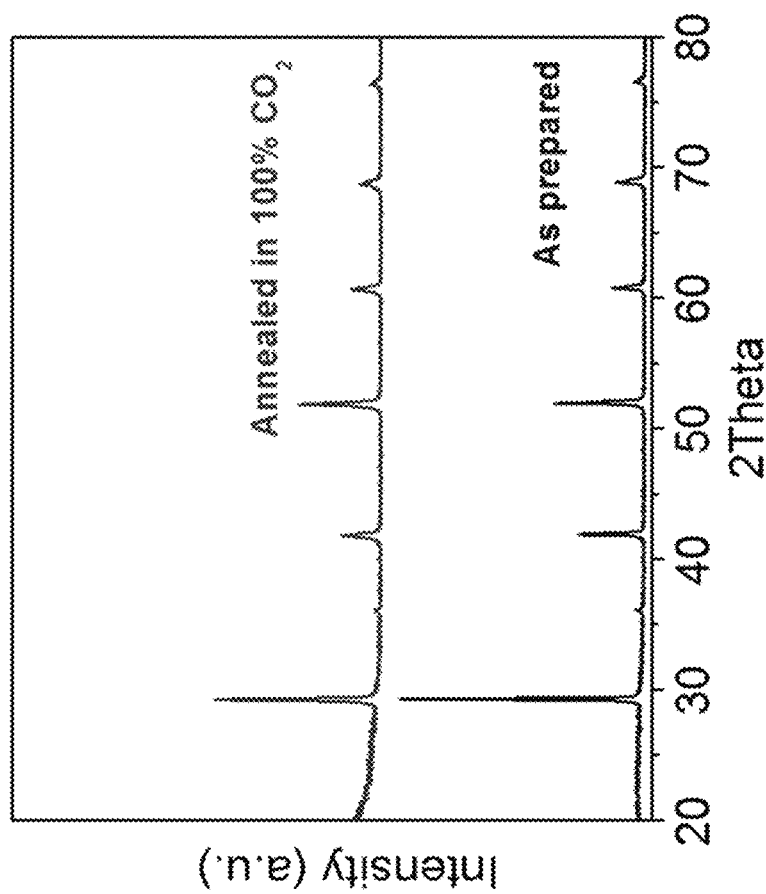
FIGS. 1A-1C depict selected characteristics of the new electrolyte material $BaZr_{0.4}Ce_{0.4}Y_{0.1}Yb_{0.1}O_3$ (BZCYYb4411).

Materials for use as electrolytes and cathodes in cells are provided. Electrochemical cells incorporating the materials include an anode, a cathode, and a solid electrolyte. Also provided are methods of making bilayered cathodes for the electrochemical cells.

The materials include barium zirconate compounds, such as yttrium-doped, ytterbium-doped, and/or holmium-doped barium zirconate compounds. The barium zirconate electrolyte compounds have the formula $BaZr_{0.4}Ce_{0.4}M_{0.2}O_3$, where M represents one or more rare earth elements. The compounds include those having the formula $BaZr_{0.4}Ce_{0.4}Y_{0.2-x}Yb_xO_3$, where 0≤x≤0.2, or the formula $BaZr_{0.4}Ce_{0.4}Ho_{0.2}O_3$. The barium zirconate compounds can be sintered to provide a high proton-conductivity polycrystalline material with grain sizes of, for example, 2 μm or greater, 3 μm or greater, and 4 μm or greater.

Various embodiments of the barium zirconate compounds and the electrochemical cells that incorporate the compounds as electrolytes are characterized by chemical stability against carbon dioxide. As a result, the open cell voltage of the electrochemical cells is not significantly reduced upon prolonged exposure to a carbon dioxide-containing environment, as illustrated in the Example, below.

A primary function of the cathode can be to catalyze the oxygen reduction reaction, written globally as:

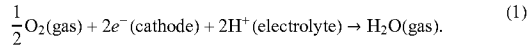

$$\frac{1}{2}O_2(gas) + 2e^-(cathode) + 2H^+(electrolyte) \to H_2O(gas). \tag{1}$$

The cells utilize proton permeable cathode materials, such as strontium cobalt compounds, including strontium cobalt ferrite perovskites. In some embodiments of the cells, the cathode comprises PBSCF. The cathode is porous to allow gaseous oxygen to access the reaction sites. By depositing thin, dense layers of the cathode material onto the solid electrolyte, good contact can be provided between the porous cathode layer and the solid electrolyte, making it possible for the fuel cells to achieve high peak power densities. By way of illustration, various embodiments of the fuel cells can provide peak power densities of at least 500 mW/cm² at 500° C. This includes embodiments of the cells that provide peak power densities of at least 540 mW/cm² at 500° C.

The cathodes can be bilayer cathodes applied using a two-step process in which a thin dense interlayer film of the cathode material is applied first, followed by the deposition of a porous overlayer of the cathode material by a different process. The interlayer film can be very thin, having a thickness of, for example, no greater than 500 nm, including no greater than 100 nm, and has a lower porosity than the porous overlayer. The porous overlayer can be considerably thicker, having a thickness of, for example, 1 μm or greater, including 10 μm or greater. The processes for depositing the dense interlayer and the porous overlayer may be, for example, vapor deposition (e.g., pulsed laser deposition) and solution phase deposition (e.g., slurry deposition), respectively. This two-step deposition process can be used to form bilayer cathodes from the perovskite cathode materials described herein, and also to form bilayer cathodes from other cathode materials.

EXAMPLE

Electrolyte

Figure 1B:
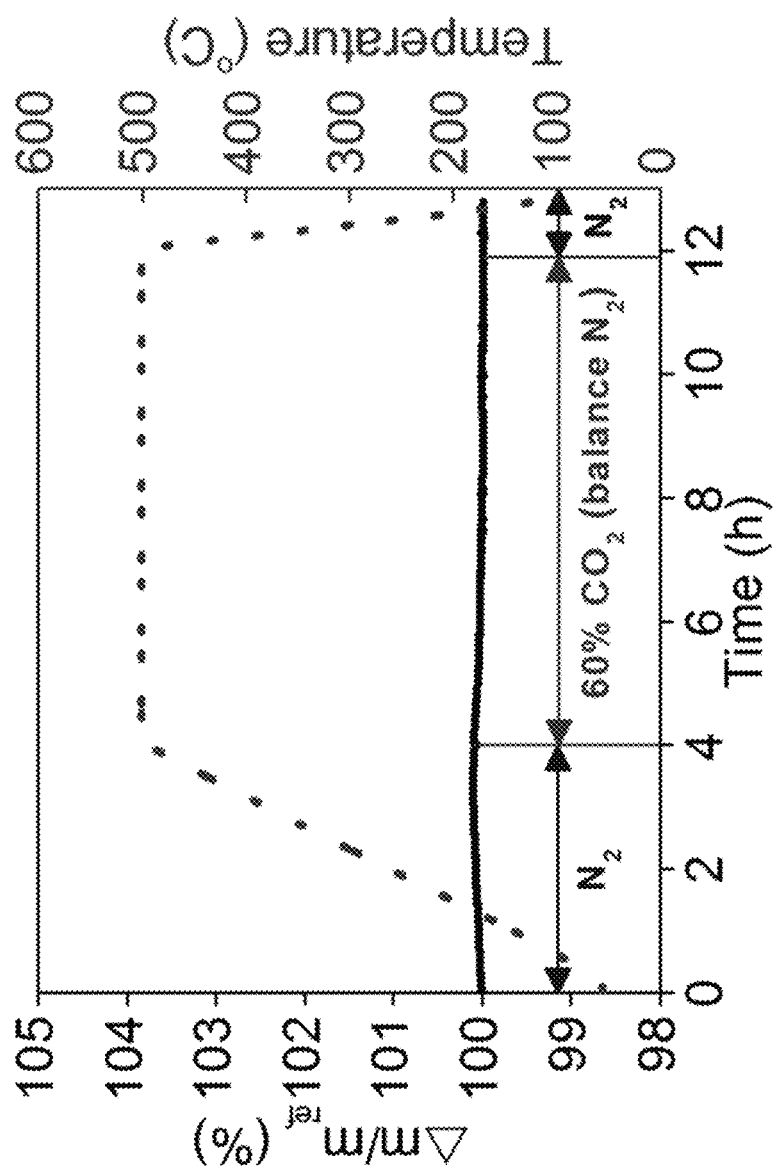
Figure 1C:
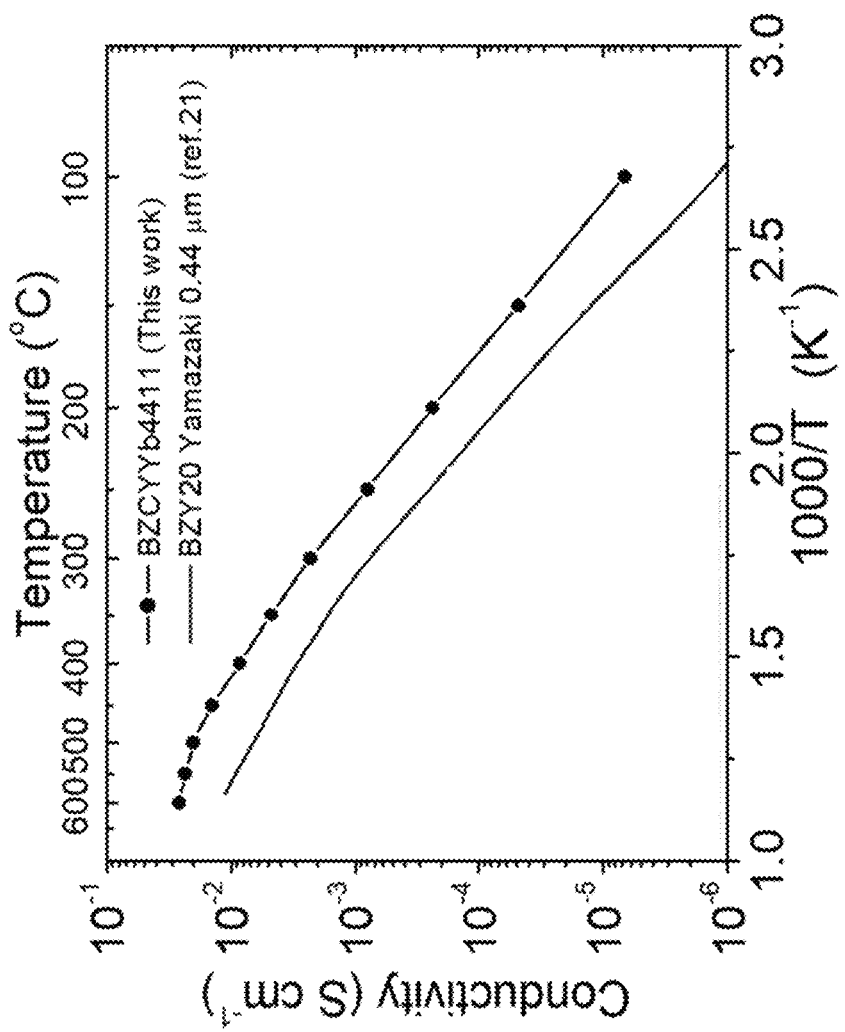
Figure 6:
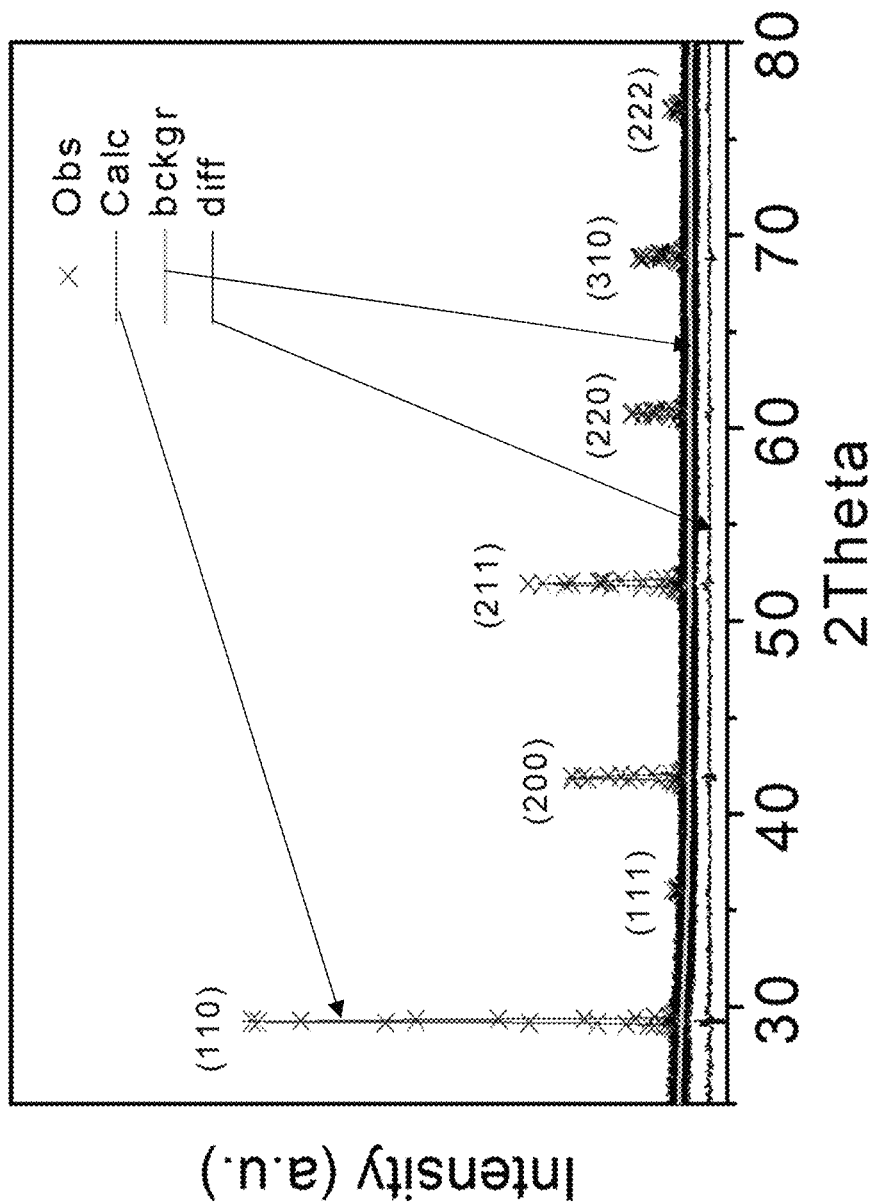
FIG. 6 shows the Rietveld refinement of the X-ray diffraction pattern for a BZCYYb4411 electrolyte. Refinement to a Pm3̄m cubic structure yielded a lattice constant of 4.3060(1) Å. ($R_{wp}$=15.1%, $R_p$=9.94% $\chi^2$=2.249).
Figure 7A:
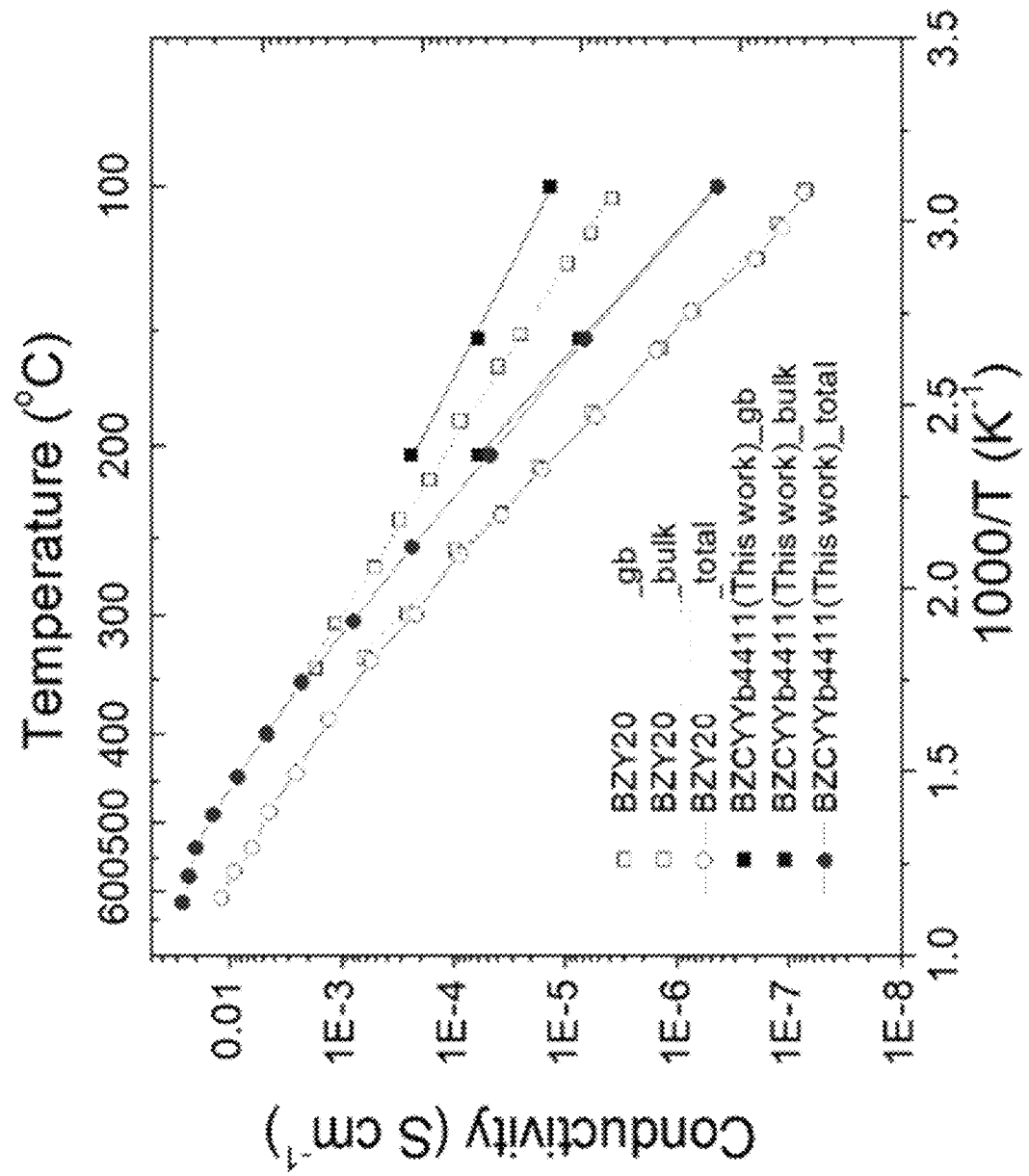
FIGS. 7A and 7B show the total conductivity comparison for a BZCYYb4411 electrolyte material and for a BZY20 electrolyte material. (See, Yamazaki, Y., et al. High total proton conductivity in large-grained yttrium-doped barium zirconate. Chemistry of Materials 21, 2755-2762 (2009).)
Figure 7B:
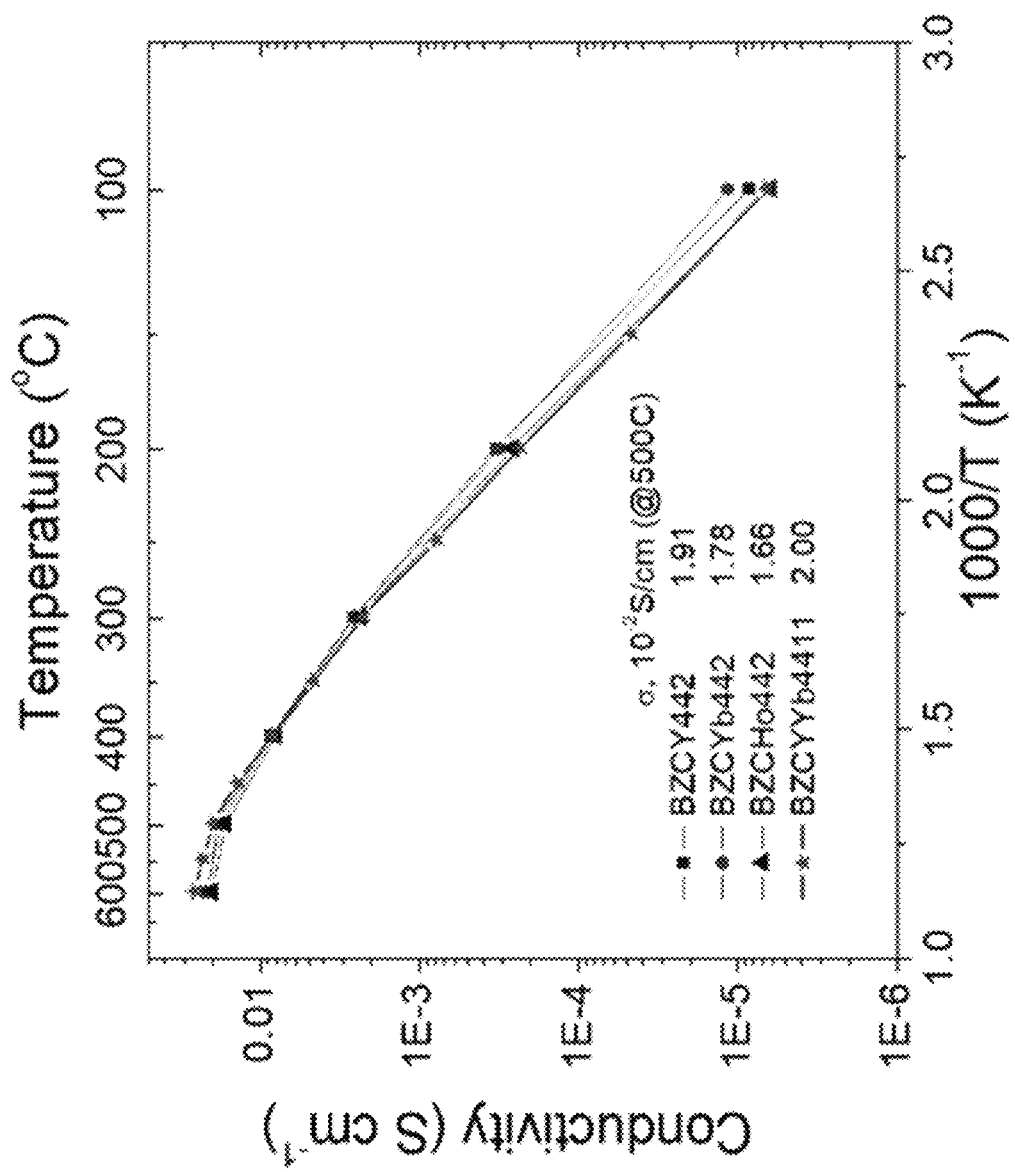

The electrolyte material of this example, BZCYYb4411, combines the chemical stability and bulk proton conductivity afforded by doped barium zirconate with ease of sintering and grain growth. BZCYYb4411 adopts a cubic crystal structure, FIG. 6, with lattice constant a=4.3060(1) Å, and remains free of barium carbonate after prolonged exposure to 100% carbon dioxide at 500° C., FIG. 1A. No weight gain indicative of carbonate formation is evident by thermogravimetric analysis, FIG. 1B. The conductivity of polycrystalline BZCYYb4411 is approximately three times greater than that of $BaZr_{0.8}Y_{0.2}O_3$ (BZY20), FIG. 1C, for compacts of similar densities prepared under similar conditions, specifically, sintered at 1600° C. for 24 h under static air, with care taken to minimize the effects of possible barium loss. (See, Yamazaki, Y., et al. High total proton conductivity in large-grained yttrium-doped barium zirconate. *Chemistry of Materials* 21, 2755-2762 (2009).) This difference in transport properties is in large part due to the much greater grain growth in BZCYYb4411. The resulting grains are 4-5 μm in size, FIG. 1C inset, as compared to a mean grain size in BZY20 of ~0.44 μm, reflecting the highly refractory nature of the latter. (See, Bozza, F., et al. Flame Spray Synthesis of $BaZr_{0.8}Y_{0.2}O_{3-\delta}$ Electrolyte Nanopowders for Intermediate Temperature Proton Conducting Fuel Cells. *Fuel Cells* 15, 588-594 (2015).) Additional benefit arises from the slightly higher bulk conductivity of BZCYYb4411, FIG. 8A, a surprising result given the prevalent view that BZY20 has the highest bulk conductivity amongst proton conducting oxide materials. (See, Fabbri, E., et al. Materials challenges toward proton-conducting oxide fuel cells: a critical review. *Chemical Society Reviews* 39, 4355-4369 (2010).) Compositions with the dopants Y and Yb replaced with single dopants 20% Y, 20% Yb and 20% Ho displayed similar chemical stability, and the conductivities are only slightly lower than that of BZCYYb4411, FIG. 7B. In contrast, the composition $BaZr_{0.1}Ce_{0.7}Y_{0.1}Yb_{0.1}O_3$ (BZCYYb1711), which has been the electrolyte in several PCFC studies, was observed here to react with $CO_2$.

Cathode

In this example, exceptional proton solubility and transport through PBSCF are demonstrated, rendering it ideal for oxygen electroreduction in PCFCs.

PBSCF is a double-perovskite of general composition $LnA'B_2O_{5+\delta}$ (Ln=La, Pr, Nd, Sm, Gd; A'=Ba, Sr; and B=Co, Fe, Mn), in which the A cation of the architype $ABO_3$ perovskite is replaced in alternating fashion with Ln and A' cations. The result is a layered structure with stacking sequence . . . $[A'O]-[BO_2]-[LnO_\delta]-[BO_2]$ . . . along the c-axis. (See, Choi, S., et al. The electrochemical and thermodynamic characterization of $PrBaCo_{2-x}Fe_xO_{5+\delta}$ (x=0, 0.5, 1) infiltrated into yttria-stabilized zirconia scaffold as cathodes for solid oxide fuel cells. *J. Power Sources* 201, 10-17 (2012); and Kim, G. et al. Rapid oxygen ion diffusion and surface exchange kinetics in $PrBaCo_2O_{5+x}$ with a perovskite related structure and ordered A cations. *J. Mater. Chem.* 17, 2500-2505 (2007).).

Electrolyte and Cathode Compatibility

Chemical compatibility between the electrolyte and PBSCF was first checked for. Powders of the cathode and electrolyte materials were combined in a 1:1 weight ratio, milled, compacted together, then heat treated at 900, 1000 and 1100° C., respectively, for 24 h under static air. The diffraction patterns obtained subsequent to these treatments are fully described by a superposition of the two individual components.

$H_2O$ Uptake Characteristics of PBSCF

Figure 2A:
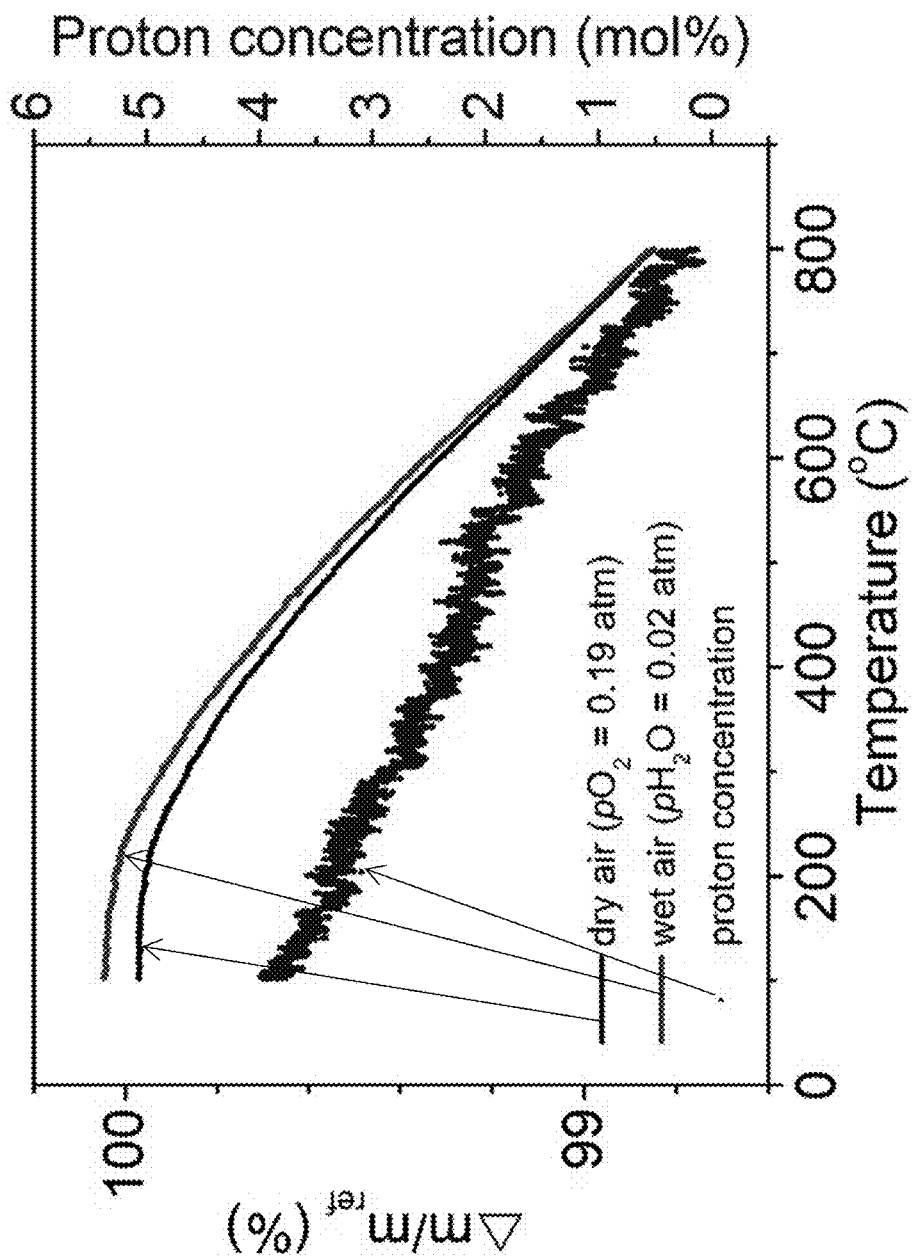
FIGS. 2A-2B depict the $H_2O$ uptake behavior of $PrBa_{0.5}Sr_{0.5}Co_{1.5}Fe_{0.5}O_{5-\delta}$ (PBSCF).

The extent of $H_2O$ uptake into PBSCF was then evaluated by thermogravimetric analysis (TGA). The mass of the material (in loose powder form) was recorded as a function of temperature under humidified ($pH_2O=0.020$ atm) and dry synthetic air ($pO_2=0.19$ atm, balance $N_2$) between 800 and 100° C. A clear difference in mass under the two atmospheres was evident at all temperatures below 800° C., FIG. 2A. This difference was attributed to $H_2O$ uptake into the bulk implies a proton concentration that ranges from 3.5 mol % at 200° C. to 1.7 mol % at 600° C.

These proton uptake results enabled evaluation of the thermodynamics of the hydration reaction:

$$H_2O + V_{\ddot{O}} + O_O^\times \leftrightarrow 2OH_O^\cdot \quad K_W = \quad (2)$$

$$\frac{[OH_O^\cdot]^2}{pH_2O[V_{\ddot{O}}][O_O^\times]} = \exp\left(\frac{\Delta S_W}{R}\right)\exp\left(-\frac{\Delta H_W}{RT}\right)$$

where $[OH_O^\cdot]$, $[V_O^{\cdot\cdot}]$, and $[O_o^\times]$ are, respectively, the proton (hydroxyl), oxygen vacancy, and oxygen concentrations in the hydrated state; $\Delta H_W$ and $\Delta S_W$ are the enthalpy and entropy, respectively, of the hydration reaction; and R and T are, respectively, the universal gas constant and temperature. The TGA results under synthetic air were used to determine the oxygen vacancy concentration under dry conditions using an oxygen stoichiometry of 5.88 at 100° C. as a reference. (See, Jeong, D. et al. Structural, Electrical, and Electrochemical Characteristics of $LnBa_{0.5}Sr_{0.5}Co_{1.5}Fe_{0.5}O_{5+\delta}$ (Ln=Pr, Sm, Gd) as Cathode Materials in Intermediate-Temperature Solid Oxide Fuel Cells. *Energy Technology*, n/a-n/a (2017).)

Figure 2B:
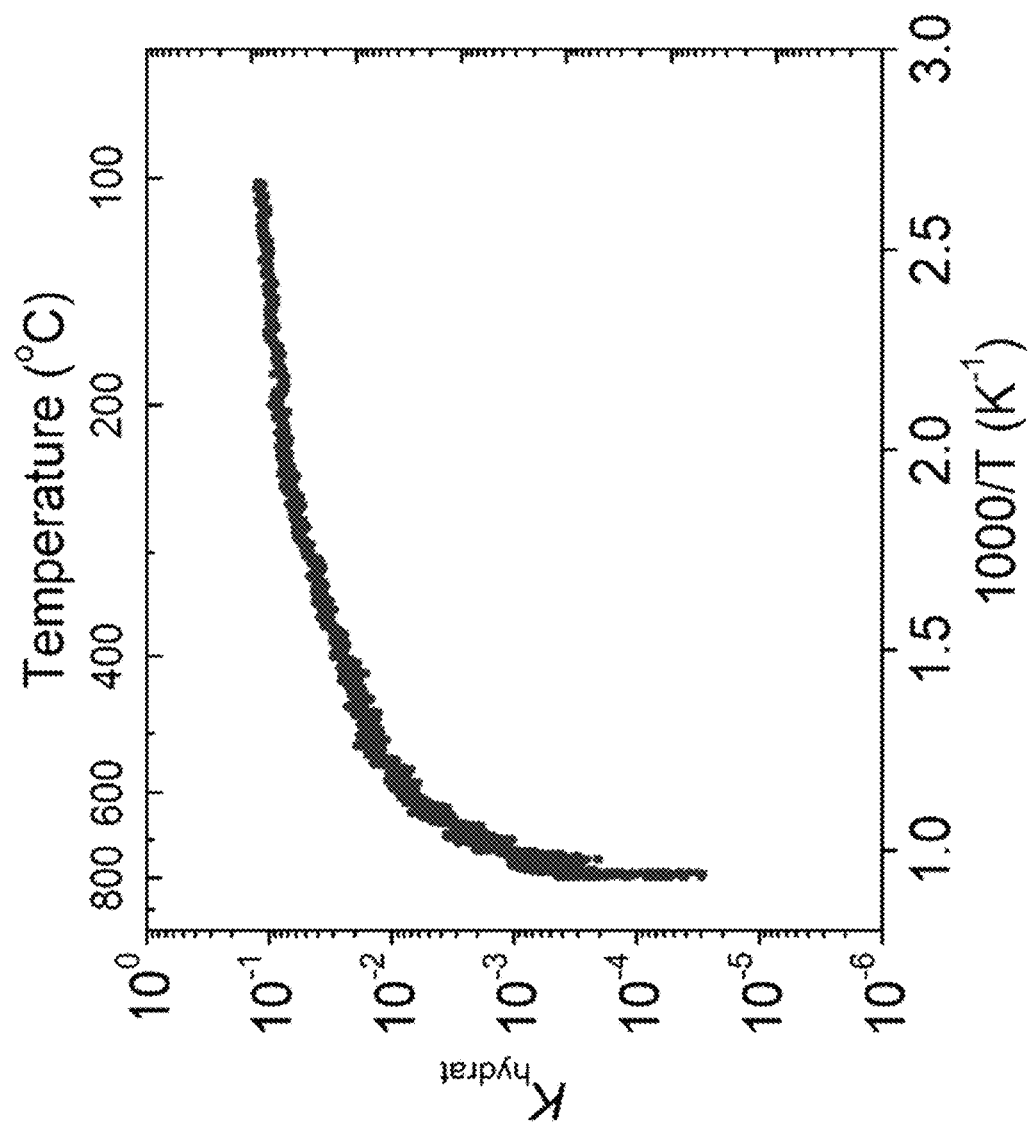

From an evaluation of the temperature dependence of $K_W$, shown in the van't Hoff plot in FIG. 2B, enthalpy and entropy values of $-22$ kJ mol$^{-1}$ and $-63$ J mol$^{-1}$ K$^{-1}$, respectively, at 400° C. were extracted. In principle, a van't Hoff analysis should be performed at fixed stoichiometry (rather than fixed chemical potential) and the significant non-linearity in the present van't Hoff plot may be a result of the changing hydration state with temperature. In addition, electronic defects can become important at high temperature and contribute to non-linearity. Nevertheless, the thermodynamic values can be compared to those reported for other oxides considered for either electrolyte or cathode applications, for which analogous analysis methodologies are employed. In this context, both the enthalpy and entropy obtained here are small in magnitude, where typical values range from $-20$ to $-170$ kJ mol$^{-1}$ and $-90$ to $-180$ J mol$^{-1}$K$^{-1}$, respectively. (See, Poetzsch, D., et al. Proton uptake in the H$^+$-Solid Oxide Fuel Cell (SOFC) cathode material $Ba_{0.5}Sr_{0.5}Fe_{0.8}Zn_{0.2}O_{3-\delta}$: transition from hydration to hydrogenation with increasing oxygen partial pressure. *Faraday discussions* 182, 129-143 (2015).) The entropy is particularly far from the range of observed values and is much smaller in magnitude than has been reported for $Ba_{0.5}Sr_{0.5}Fe_{0.8}Zn_{0.2}O_{3-\delta}$ and $BaCo_{0.4}Fe_{0.4}Zr_{0.2}O_{3-\delta}$ (respectively, $-145\pm30$ and $-103\pm5$ J mol$^{-1}$ K$^{-1}$), the only other 'triple conducting oxides' for which the thermodynamics have been determined. (See, Poetzsch, D., et al. Proton uptake in the H$^+$-SOFC cathode material $Ba_{0.5}Sr_{0.5}Fe_{0.8}Zn_{0.2}O_{3-\delta}$: transition from hydration to hydrogenation with increasing oxygen partial pressure. *Faraday discussions* 182, 129-143 (2015); and Zohourian, R., et al. Proton uptake into the protonic cathode material $BaCo_{0.4}Fe_{0.4}Zr_{0.2}O_{3-\delta}$ and comparison to protonic electrolyte materials. *Solid State Ionics* 299, 64-69 (2017).) Thus, the entropic penalty of hydrating the double-perovskite is small in comparison to other materials and correlates with the much higher proton content. For example, the proton concentration in $BaCo_{0.4}Fe_{0.4}Zr_{0.2}O_{3-\delta}$ is just 0.5 mol % (equivalent to 1.0 mol % for comparison to the double perovskite) at 400° C. in 0.065 atm $pH_2O$. (See, Zohourian, R., et al. Proton uptake into the protonic cathode material $BaCo_{0.4}Fe_{0.4}Zr_{0.2}O_{3-\delta}$ and comparison to protonic electrolyte materials. *Solid State Ionics* 299, 64-69 (2017).) Significant also is the extremely rapid mass response to the imposed temperature steps, with mass increasing almost entirely in synchronization with the temperature during each cooling step. Such fast mass changes imply rapid migration of all the relevant ionic defects of Eq. (2).

Figure 3A:
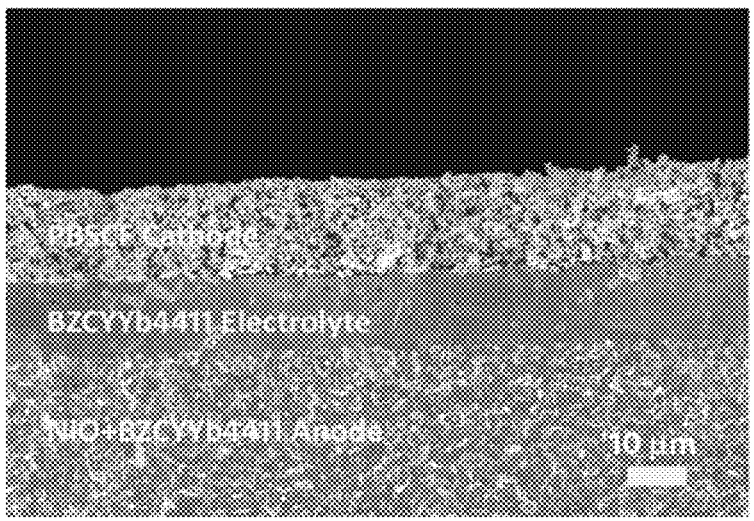
FIGS. 3A-3C depict scanning electron microscopy images of an electrochemical cell with PBSCF as the cathode, BZCYYb4411 as the electrolyte, and a composite of Ni+BZCYYb4411 as the anode.
Figure 3B:
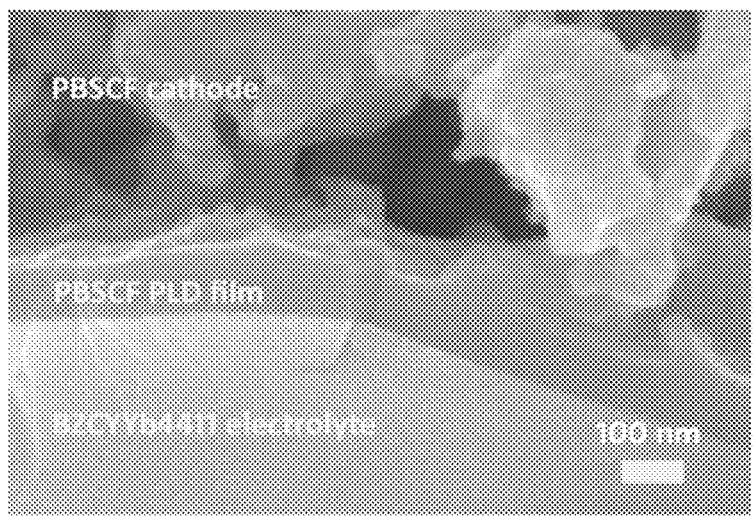
Figure 3C:
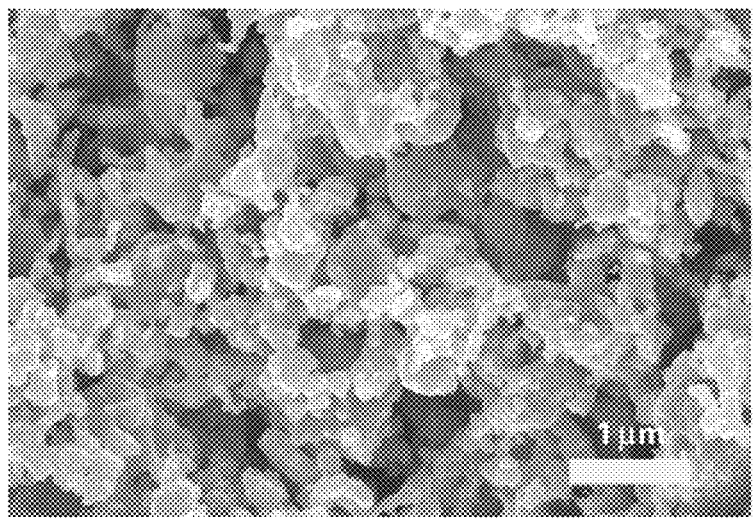

Fuel Cell Design and Electrochemical Evaluation: Introducing a PLD Cathode Layer Anode-supported cells incorporating neat PBSCF as the cathode and Ni+BZCYYb4411 as the anode were then prepared. A mixture of NiO, BZCYYb4411, and starch (a fugitive pore-former) were combined in a weight ratio of 65:35:5, milled, then pressed into a disc and lightly sintered at 800° C. for 4 h. A thin layer of BZCYYb4411 was subsequently applied by drop-casting. After removal of organics from the electrolyte layer at 400° C., the anode-electrolyte bi-layer structure was sintered at 1500° C. for 4 h. With the aim of addressing the apparently poor cathode-electrolyte contact in a typical SOFC fabrication, the cathode layer was applied using two different approaches. In one case, a typical procedure was followed in which a slurry of PBSCF was directly painted onto the electrolyte surface. In the second case, a thin (~100 nm) layer of PBSCF was first applied by pulsed laser deposition (PLD), on top of which the standard slurry was brush-painted. The final sintering step was carried out at 950° C. in air (4 h). For both types of cells the electrolyte was ~15 μm thick and the cathode ~20 μm thick, FIG. 3A, with the PLD cathode layer forming a conformal coating onto the electrolyte, FIG. 3B, and the cathode retaining good porosity after the final sintering step, FIG. 3C. Ag wires were attached to both electrodes, and the electrical behavior was measured in a pseudo-four probe configuration (eliminating the resistance of the lead wires).

Figure 4A:
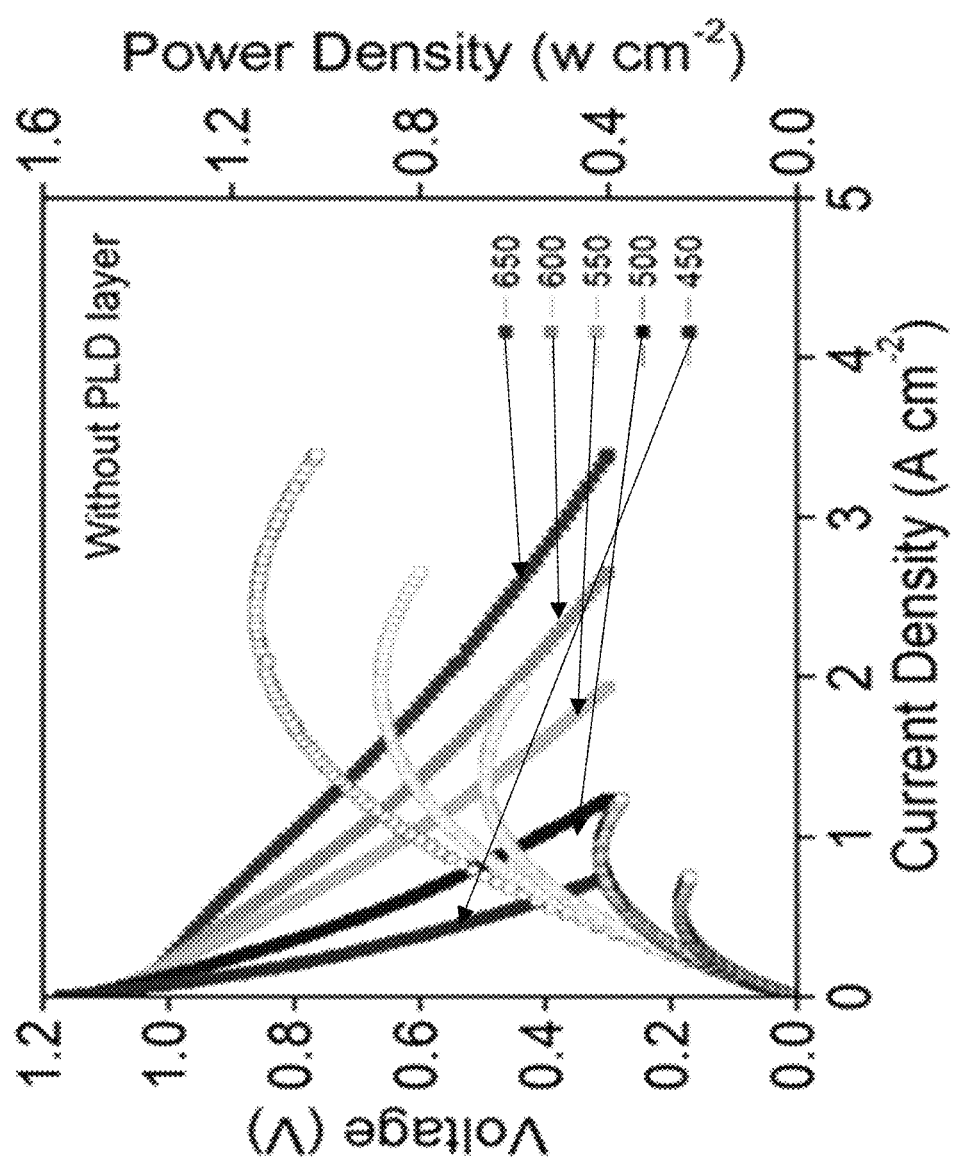
FIGS. 4A-4F depict electrochemical properties of electrochemical cells, with PBSCF as the cathode, BZCYYb4411 as the electrolyte, and a composite of Ni+BZCYYb4411 as the anode, using humidified (3% $H_2O$) $H_2$ as fuel and dry air as an oxidant at various temperatures.
Figure 4B:
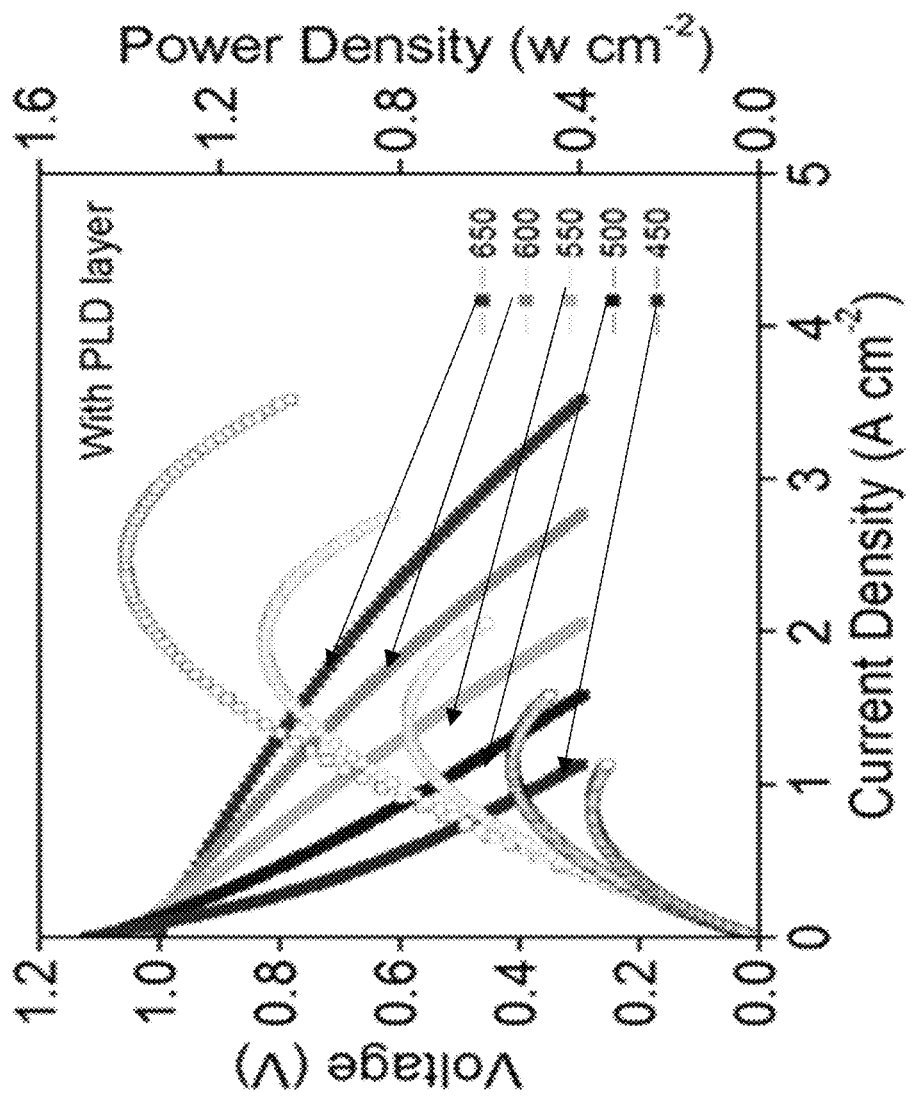

The polarization behavior, FIGS. 4A and 4B, collected with humidified $H_2$ supplied to the anode and synthetic air to the cathode, revealed exceptionally high activity for the PBSCF cathode. Even for the conventionally prepared cell, the peak power density at 600° C. exceeded 800 mW $cm^{-2}$. Application of the PLD layer resulted in a marked increase in power output. The peak power density at 600° C. became 1098 mW $cm^{-2}$, surpassing all previous records, including the 747 mW $cm^{-2}$ attained using SSC as the cathode and dry $O_2$ as the oxidant (where the latter typically boosts the voltage relative to conventional operation on air). (See, Nien, S. H., et al. Preparation of $BaZr_{0.1}Ce_{0.7}Y_{0.2}O_{3-\delta}$ Based Solid Oxide Fuel Cells with Anode Functional Layers by Tape Casting. *Fuel Cells* 11, 178-183 (2011).) At 500° C., the peak power density of 548 mW $cm^{-2}$ exceeded the value of 455 mW $cm^{-2}$ reported for $BaCo_{0.4}Fe_{0.4}Zr_{0.1}Y_{0.1}O_{3-\delta}$, a material explicitly designed to display protonic conductivity, in addition to electronic and oxygen ion conductivity. (See, Duan, C. et al. Readily processed protonic ceramic fuel cells with high performance at low temperatures. *Science* 349, 1321-1326 (2015).) The possibility that Ag in the current collector contributed non-trivially to the measured activity was eliminated by the observation of low power density from a cell in which the PBSCF was omitted and only Ag paste was utilized. Overall, the behavior reported here competes with that of high performance SOFCs based on oxide ion conductors.

Figure 4C:
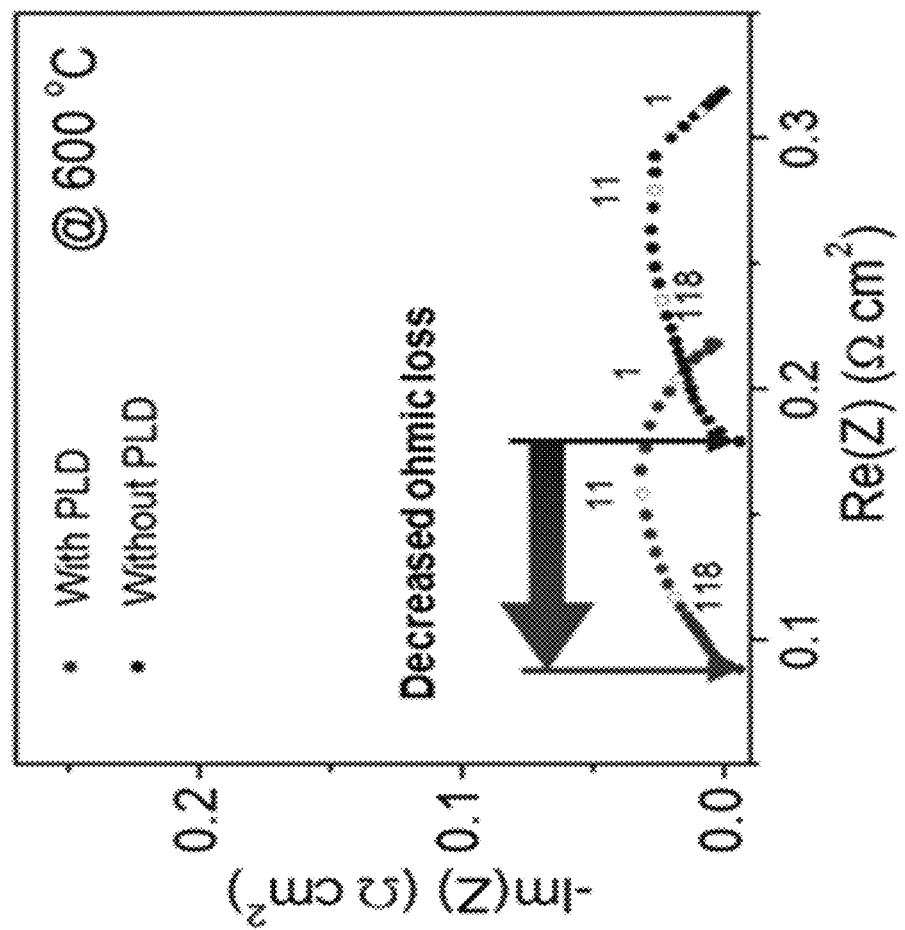
Figure 4D:
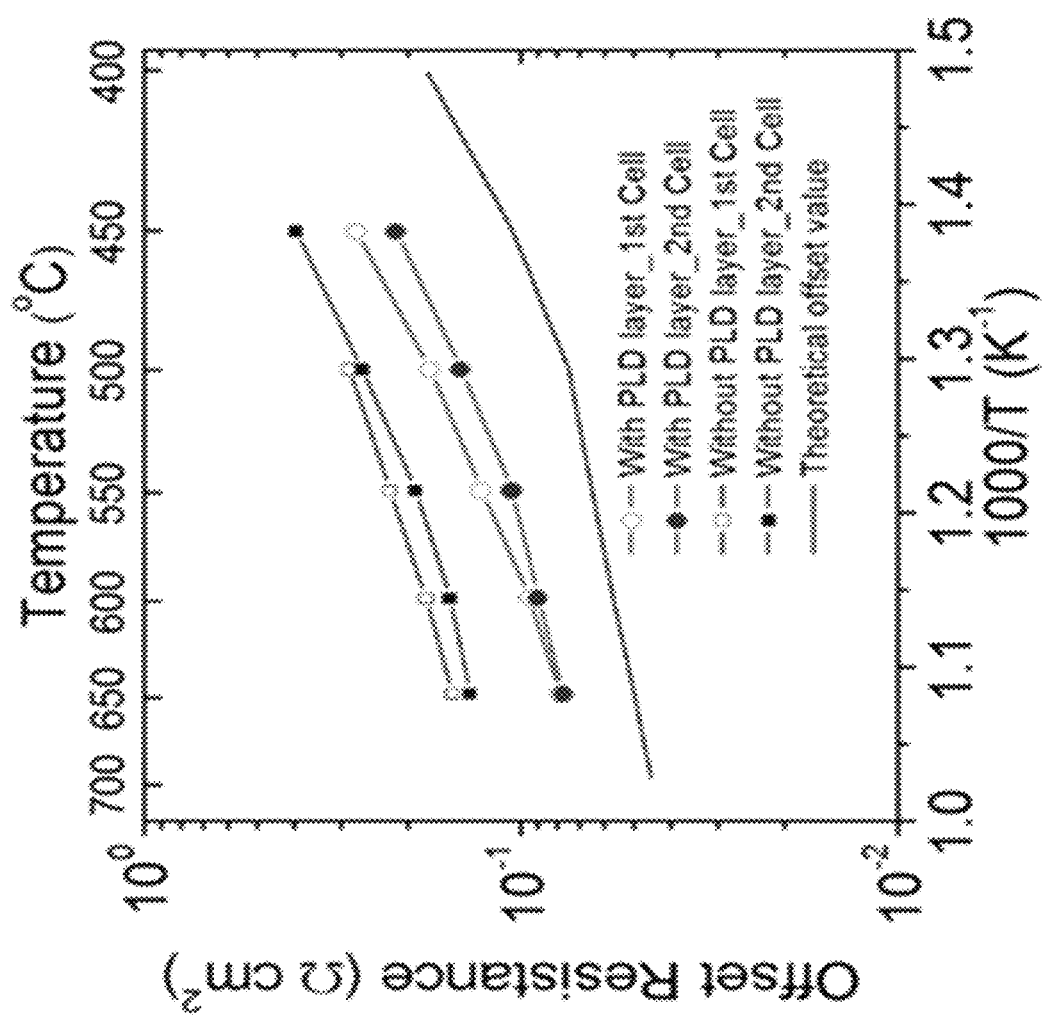
Figure 4E:
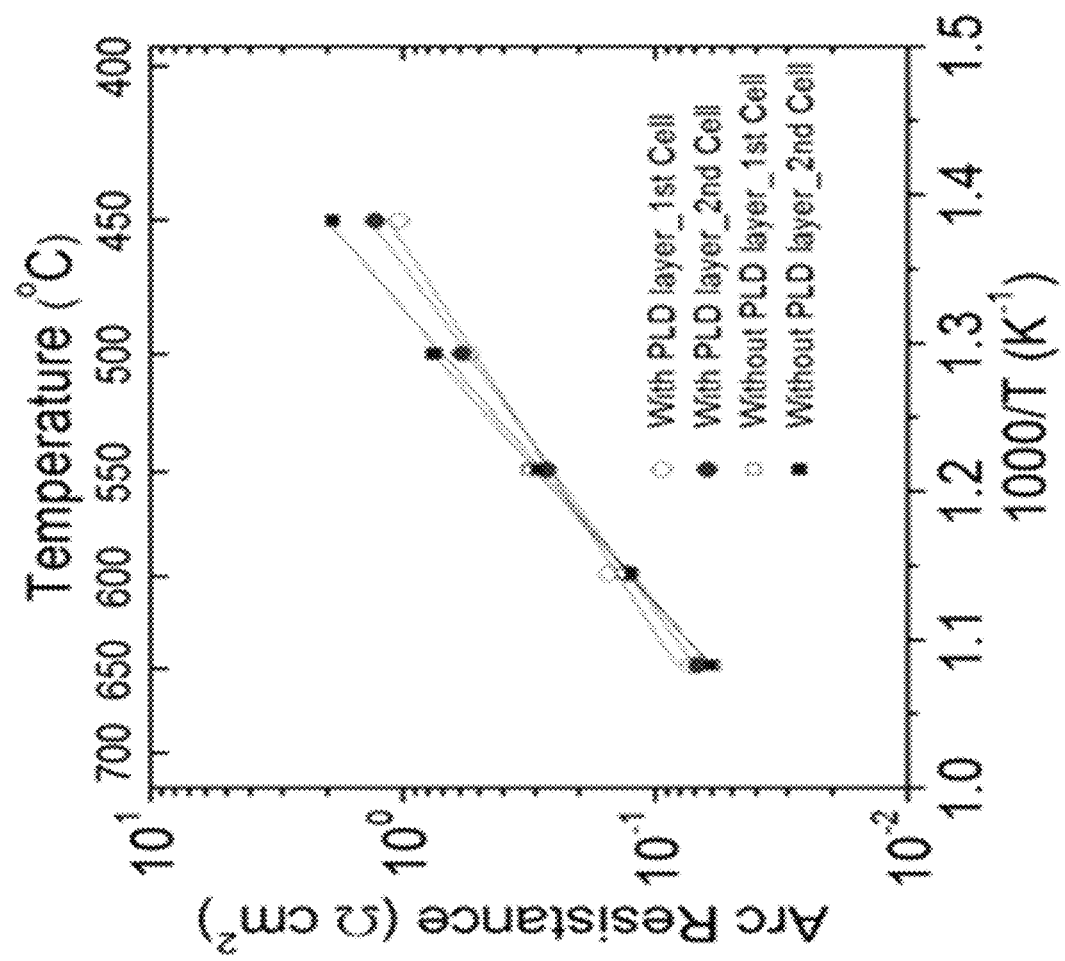

To elucidate the role of the cathode PLD layer, the A.C. electrical impedance was measured under open circuit conditions, enabling deconvolution of the various contributions to the overall cell resistance. Plotted in the complex plane, each impedance spectrum showed a single, depressed arc, attributed to the electrochemical reaction resistance, with a finite offset from the origin, representing the ohmic losses (FIG. 4C). Application of the PLD layer dramatically decreased the offset resistance in FIG. 4D, demonstrating an improvement in the cathode-electrolyte contact, as intended. In contrast, application of the PLD layer had only a slight impact on the electrochemical resistance, marginally decreasing the activation energy such that this resistance contribution was slightly decreased in the lower temperature regime, FIG. 4E. These characteristics were reproducibly observed in two pairs of cells, as indicated in FIGS. 4D and 4E, and in additional cells evaluated only at high temperature.

Figure 4F:
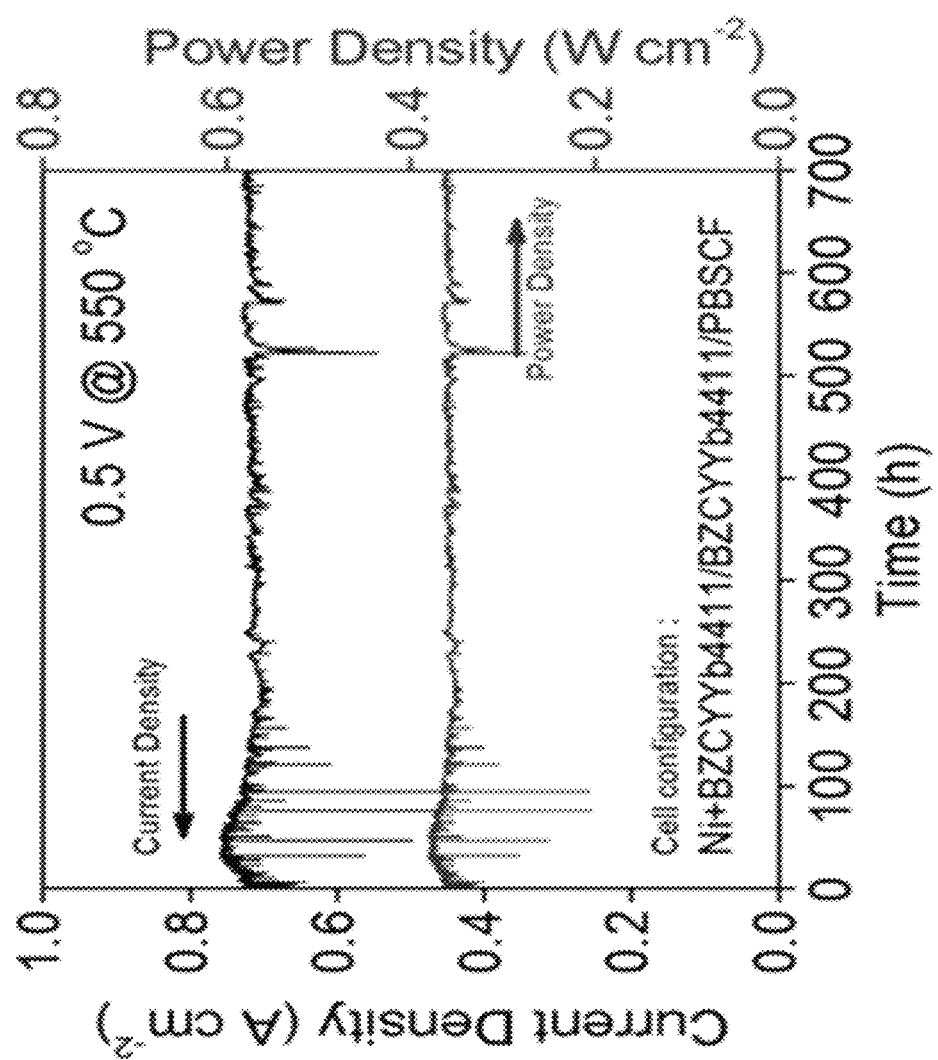
Figure 8B:
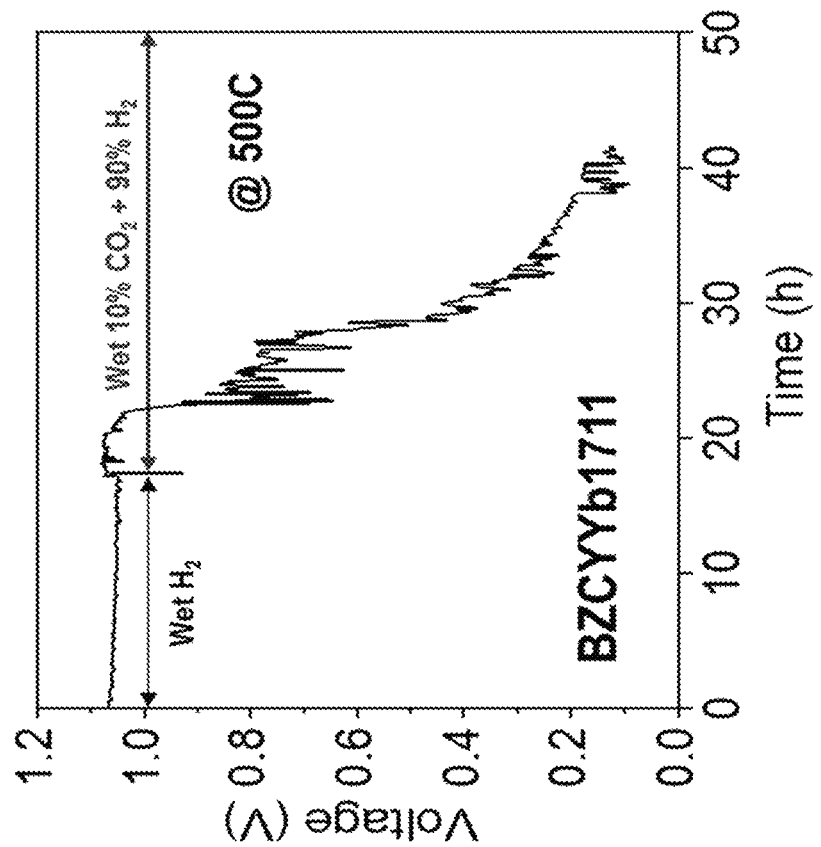
FIGS. 8A and 8B depict the temporal evolution of fuel cell OCV at 500° C. with humidified (3% $H_2O$) 10% $CO_2$ and 90% $H_2$ supplied to the anode and air to the cathode using cells of two different electrolytes: (A) BZCYYb4411; and (B) BZCYYb1711. The OCV from the BZCYYb4411-based cell is extremely stable for a 100 h period of measurement, deviating from the initial value by no more than 1%. In contrast, the OCV of the BZCYYb1711-based cell falls by 86% OCV in just 20 h, clearly reflecting the chemical instability of BZCYYb1711.
Figure 8A:
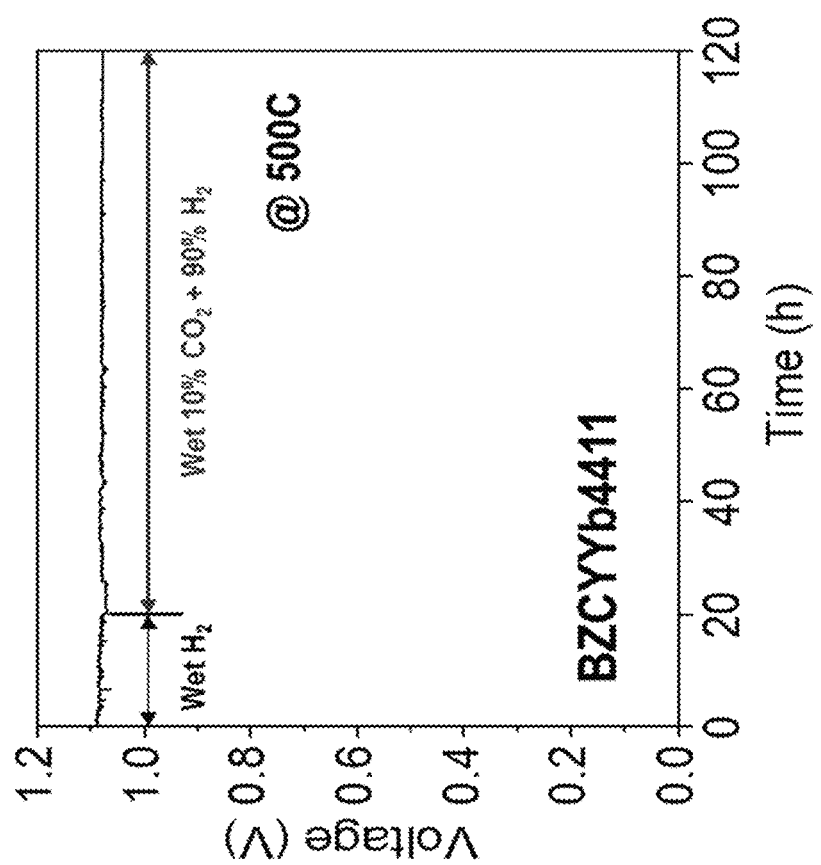

The stability of the cell components was then examined by evaluating two cells (each prepared without a PLD layer) for prolonged periods. In one case, the OCV was measured upon exposure of the anode to a humidified mixture of $CO_2$ and $H_2$, and in the second the current was measured upon exposure to humidified hydrogen at a constant cell voltage. Under both conditions, the cells displayed excellent stability. As measured over a 100 h period, the OCV deviated from the initial value by no more than 1% (FIG. 8A). In contrast, an analogous BZCYYb1711 based-cell showed an 86% OCV loss after just 20 h of measurement (FIG. 8B). At constant voltage, FIG. 4F, excellent stability was also observed, in this case after a break-in period of approximately 150 h. The morphological features of the cell appeared unchanged by the 700 h measurement, as determined by Scanning Electron Microscopy (SEM).

Oxygen Electrochemical Reduction Pathway on PBSCF

Figure 5A:
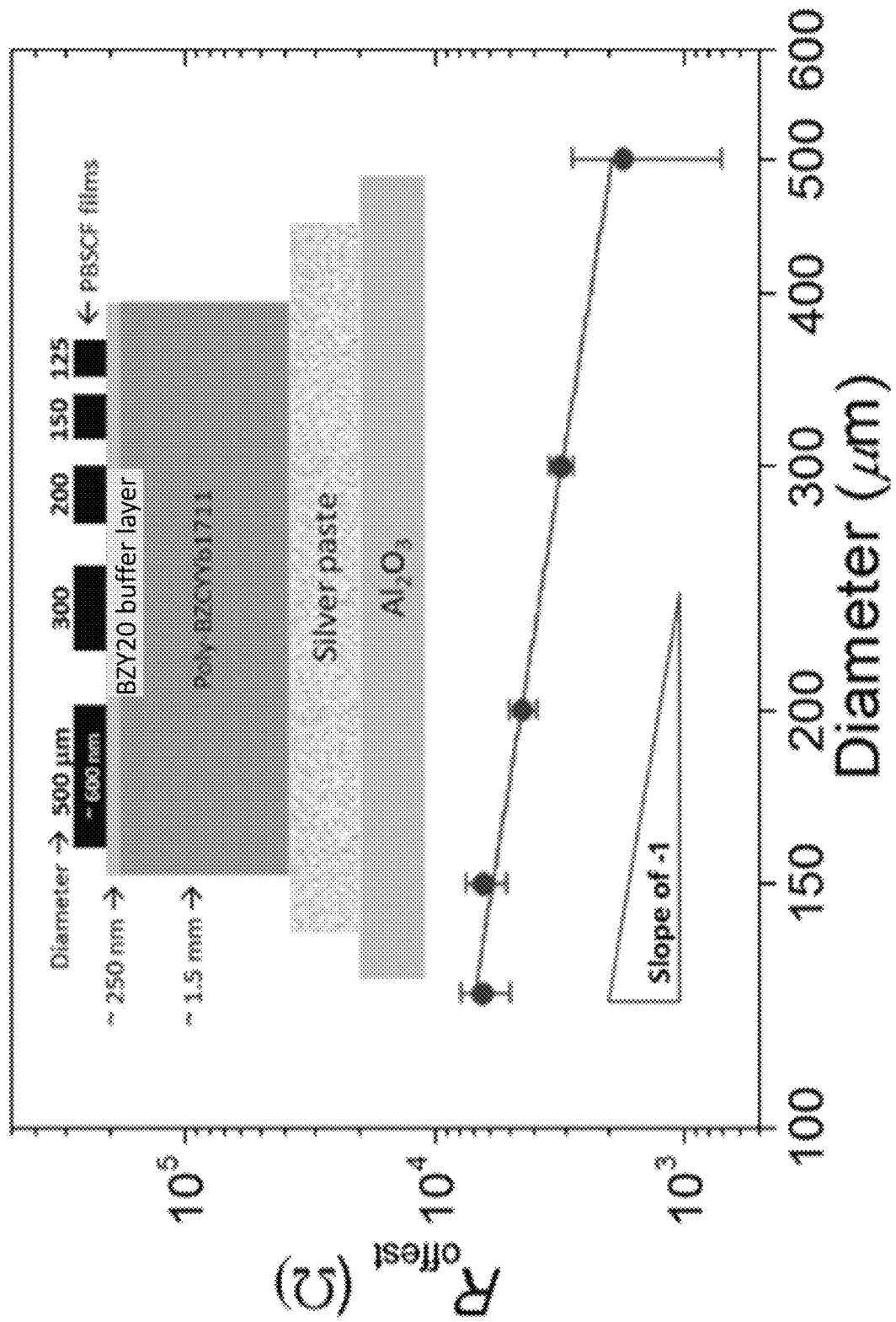
FIGS. 5A and 5B depict the electrochemical behavior of microdot PBSCF at 500° C. under lightly humidified synthetic air, as determined from a.c. impedance spectroscopy.

The high performance and the high $H_2O$ uptake into PBSCF suggests that the oxygen electrochemical reaction occurred by a double-rather than triple-phase boundary pathway, with protons migrating through the bulk of the PBSCF and reacting with oxygen at the cathode/gas interface. Such a pathway is strongly indicated by the observation that a dense PBSCF layer on the cathode side of the electrolyte enhances rather than diminishes cell performance. Success relies on the ion permeability of the cathode material. The possibility of reaction via a double-phase boundary pathway was directly examined by measuring the electrochemical properties of PBSCF thin film (~600 nm) microdot electrodes deposited onto the surface of dense, polycrystalline BZCYYb1711 ~1.5 mm in thickness, FIG. 5A inset. To provide a smooth surface for electrode deposition, a thin (~250 nm) buffer layer of BZY20 was first applied. X-ray diffraction analysis confirmed the absence of reactivity between these components, and atomic force microscopy revealed that the PBSCF surface had a rms roughness of 43.8 nm, reflecting the roughness of the underlying polycrystalline substrate. The PBSCF film was patterned by ion milling to create sharply-defined microelectrodes ranging in diameter from 125 to 500 μm, with over ten duplicates of each diameter. The A.C. electrical impedance was then measured at each microelectrode, using an automated probe station described previously. (See, Usiskin, R. E., et al. Probing the reaction pathway in $(La_{0.8}Sr_{0.2})_{0.95}MnO_{3+\delta}$ using libraries of thin film microelectrodes. *Journal of Materials Chemistry A* 3, 19330-19345 (2015).) Data were recorded under 0.2 atm $O_2$ (balance Ar) at 500° C. after a 24 h stabilization period. Under these conditions, BZCYYb1711, like BZCYYb4411, is predominantly a proton conductor, ensuring that the electrochemical response measured here is that associated with reaction (1), as catalysed by PBSCF.

Figure 5B:
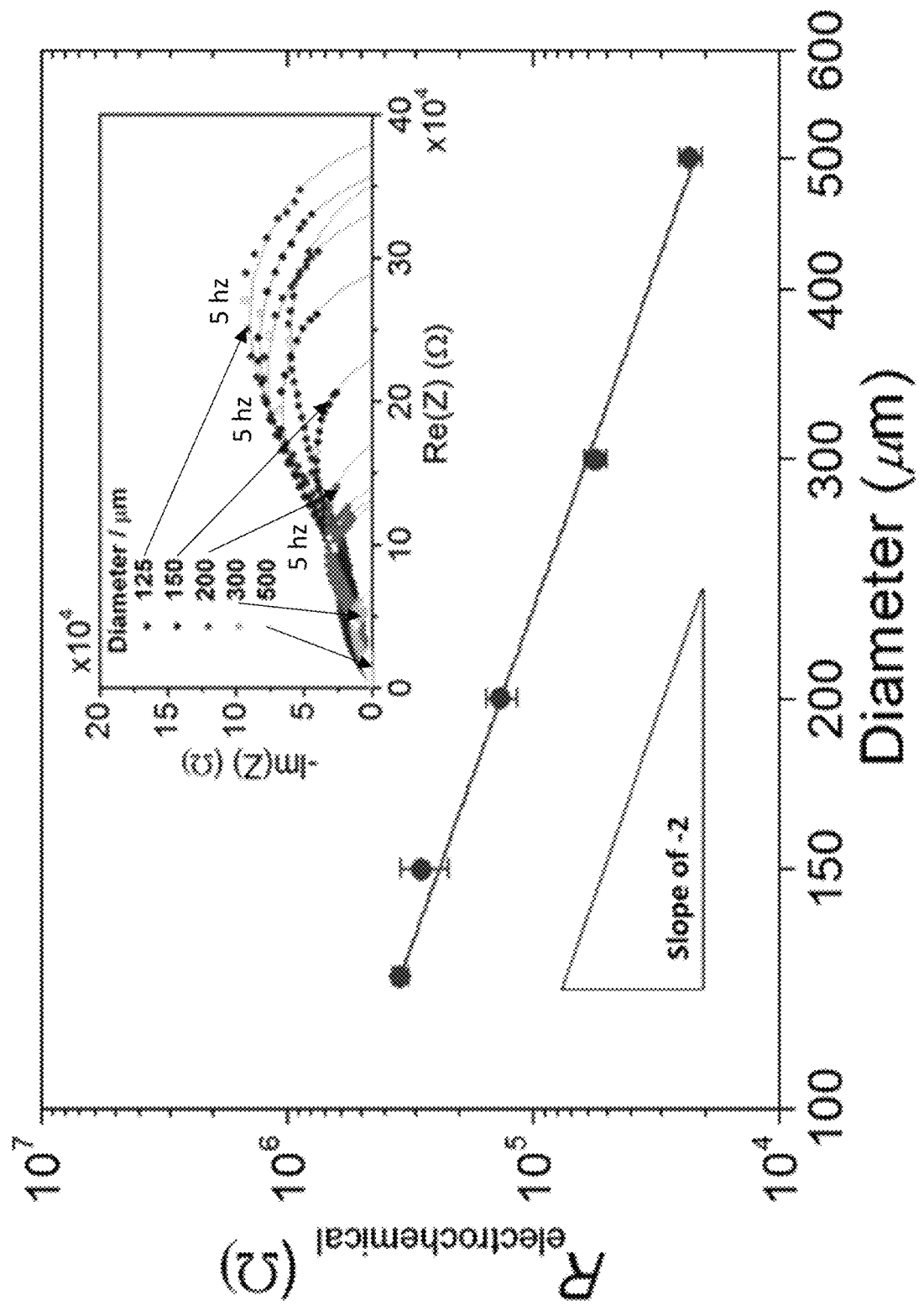

All impedance spectra could be adequately described by an equivalent circuit composed of a resistor ($R_{offset}$) in series with two subcircuits, each composed of a resistor in parallel with a constant phase element, FIG. 5B inset. For this example, the sum of these two resistances was taken to be the electrochemical reaction resistance ($R_{electrochemical}$). For the geometry considered (a semi-infinite conductor), the offset resistance was expected to be dominated by the resistance of the underlying electrolyte, with a scaling with diameter according to the Newman equation $R_{offset}=1/(2\sigma D)$, where $\sigma$ and D are the electrolyte conductivity and the microelectrode diameter, respectively. (See, Newman, J. Resistance for flow of current to a disk. *J. Electrochem. Soc.* 113, 501-502 (1966).) In accord with this expression, a double-logarithmic plot of $R_{offset}$ vs D, yielded a line with a slope close to −1, FIG. 5A, and an implied conductivity of $5.6 \times 10^{-3}$ S cm$^{-1}$ at 500° C. (in reasonable agreement with the properties of BZCYYb1711). The electrochemical resistance was expected to be dominated by the properties of the microelectrode. Here, the double-logarithmic plot yielded a slope of −2, which would have resulted from a process occurring via a double-phase boundary pathway, FIG. 5B. That is, the data revealed that resistance scaled inversely with area, demonstrating that the entire surface of the microelectrode was electrochemically active. This feature, enabled in part by the high solubility of $H_2O$ into the oxide, contributed to the very activity of PBSCF for the oxygen reduction reaction in the PCFCs.

Methods

Cathode preparation. Powders of PBSCF were synthesized via a variant of the Pechini process in which nitrate precursors are dissolved in aqueous solution and citric acid and ethylene glycol are used as complexing agents. (See, Pechini, M. P. Method of preparing lead and alkaline earth titanates and niobates and coating method using the same form a capacitor U.S. Pat. No. 3,330,697. (1967).) The char resulting from the gelation and drying steps was calcined at 600° C. to eliminate organic residue. The calcined powders were ball milled, then sintered at 1150° C. for 12 h to achieve single phase products, as confirmed by XRD (Scintag XDS2000, Cu Kα radiation, 40 kV, 20 mA).

Proton uptake measurement. To evaluate proton uptake in PBSCF, TGA was carried out using a Netzsch STA 449 C on powder samples in dry and wet air. 200 sccm of synthetic air and 20 sccm Ar were supplied to the measurement chamber to obtain an oxygen partial pressure (pO$_2$) of 0.19 atm. For the wet air condition, the gas mixture was bubbled through a distilled water bubbler held at 18° C. to obtain a water partial pressure (pH$_2$O) of 0.020. Under both conditions, the sample temperature was first increased from 100 to 800° C. at 5° C. min$^{-1}$, and weight data was then recorded upon cooling to 100° C. Two sets of data were collected. In one case the temperature was continuously cooled at a rate of 0.5° C. min$^{-1}$ (FIG. 2A); in the second case the temperature decreased in 100° C. steps with a 3 h dwell at each step. Good agreement was obtained, particularly at 400° C. and higher, indicating equilibration of the sample at those temperatures.

Electrolyte preparation and characterization. The multi-component electrolyte oxides (BaZr$_{0.4}$Ce$_{0.4}$Y$_{0.2}$O$_3$ (BZCY442), BaZr$_{0.4}$Ce$_{0.4}$Yb$_{0.2}$O$_3$ (BZCYb442), BaZr$_{0.4}$Ce$_{0.4}$Ho$_{0.2}$O$_3$ (BZCHo442), BaZr$_{0.4}$Ce$_{0.4}$Y$_{0.1}$Yb$_{0.1}$O$_3$ (BZCYYb4411), BaZr$_{0.1}$Ce$_{0.7}$Y$_{0.1}$Yb$_{0.1}$O$_3$ (BZCYYb1711)) were prepared by a solid state reaction of stoichiometric quantities of barium carbonate (>99%, Sigma Aldrich), zirconium oxide (99.5%, Alfa Aesar), cerium oxide (99.9%, Alfa Aesar) and the oxides of the dopants, yttrium oxide (99.9%, Alfa Aesar), ytterbium oxide (99.9%, Alfa Aesar) and holmium oxide (99.9%, Alfa Aesar). The mixture was first ball-milled for 24 h with yttria-stabilized zirconia balls using ethanol as the milling medium. After the ethanol was removed via a drying step at 100° C., the powder was lightly ground, and then calcined at 1100° C. for 10 h (5° C./min for heating and cooling rates). The milling and calcination steps were repeated a second time to ensure phase formation. A green compact was prepared from the resulting powder by first applying uniaxial pressure of 20 MPa in a cylindrical die, then applying ~250 MPa in an isostatic press. The green body was sintered at 1600° C. for 12~24 h, during which the sample was entirely covered with a mixture of powder of the same composition and excess barium carbonate to avoid barium loss to evaporation. (See, Babilo, P., et al. Processing of yttrium-doped barium zirconate for high proton conductivity. *Journal of materials research* 22, 1322-1330 (2007).) The covering powder was firmly compacted by lightly pressing the die shaft onto the powder inside the sintering crucible.

The conductivity of the BZCY442, BZCYb442, BZCHo442, and BZCYYb4411 samples was measured by impedance spectroscopy over the frequency range of 5 MHz to 10 Hz using a Biologic (SP-300) with an applied alternating current (ac) voltage amplitude of 20 mV. Silver paint (SPI, Product 05063-AB) electrodes were applied onto both surfaces of the polished sample. The impedance spectra were collected under a water-saturated N$_2$ atmosphere (pH$_2$O=0.031 atm) from 100 to 600° C. For the chemical stability under CO$_2$, BZCYYb4411 and BZCYYb1711 were measured using thermogravimetric analysis (TGA) by a Netzsch STA (simultaneous thermal analyzer) 449 C using powder samples. The temperature was increased from 100 to 500° C. with 2° C. min$^{-1}$ in N$_2$ and held for 8 hours in 60% CO$_2$ balanced in N$_2$. And XRD pattern of the BZCYYb1711 sample was collected after TGA measurement. Further, BZCY442, BZCYb442, BZCHo442, BZCYYb4411 samples were measured to obtain the XRD patterns in the as-sintered state, and after exposure to 100% CO$_2$ at 500° C.

Conventional fuel cell fabrication. Anode-supported fuel cells with a configuration of NiO-BZCYYb4411/BZCYYb4411/PBSCF and NiO-BZCYYb1711/BZCYYb1711/PBSCF were fabricated using a drop-coating method to conduct fuel cell measurements. The anode was formed from in-house synthesized NiO and electrolyte powders (BZCYYb4411 and BZCYYb1711), the former by the glycine nitrate process, and the latter by a typical solid state reaction method. For NiO synthesis, nickel nitrate was dissolved in distilled water and glycine was added in the solution in a 1:1 molar ratio. The solution was heated on a hot plate set at 350° C. to evaporate water, yielding a viscous liquid. Fine NiO powders were obtained via a subsequent combustion reaction. The resulting NiO powder was calcined at 800° C. for 4 h in air. The NiO-BZCYYb4411 and NiO-BZCYYb1711 composite anodes were prepared by ball milling NiO powder, electrolyte powders (BZCYYb4411 and BZCYYb1711), and starch in a weight ratio of 65:35:0.5 in ethanol for 24 h. After a drying step, the composite powders were mechanically pressed into a disc and lightly sintered at 800° C. for 4 h.

A thin electrolyte layer (either BZCYYb4411 or BZCYYb1711) was applied atop the porous anode by a drop coating technique. Specifically, the electrolyte powder was suspended in a multi-component organic fluid in a 1:10 solid-to-fluid weight ratio, where the fluid was comprised of a mixture of 2-butanol binder (Alfa Aesar), polyvinyl butyral (Tape Casting Warehouse, TCW), butyl benzyl phthalate (TCW), polyalkylene glycol (TCW), and triethanolamine (Alfa Aesar). After drop-coating onto the lightly fired anode support, the resulting anode/electrolyte bi-layer was heat-treated at 400° C. for 1 h to remove organics. Sintering was carried out immediately thereafter in a two-step protocol in which the sample was first exposed to 1550° C. for 2 min and then 1500° C. (BZCYYb4411) and 1400°

C. (BZCYYb1711) for 4 h to maximize grain growth while minimizing barium volatilization. The resulting electrolyte thickness was ~15 μm. The cathode layer was applied in the form of a slurry, comprised of a mixture of PBSCF powder and the organic binder, V-006 (Heraeus) in a 1:1.2 ratio. After slurry deposition onto the electrolyte layer, the complete cell was sintered at 950° C. for 4 h in air, resulting in a cathode layer ~20 μm thick with an effective area of 0.28 cm$^2$. The microstructures and morphologies were observed using a field emission scanning electron microscope (SEM) (Hitachi SU8030).

Fuel cell fabrication with pulsed laser deposition (PLD) layer. To facilitate the PLD of the PBSCF, large targets of the material were fabricated. Pre-calcined PBSCF powders were mechanically pressed into discs by a uniaxial press (20 MPa for 1 min), then further pressed in an isostatic press (~250 MPa for 20 min). Green bodies were sintered at 1150° C. for 12 h to yield compacts ~24 mm in diameter and 4-5 mm in thickness. Typical densities were ~95% of theoretical densities, as determined by the Archimedes method. PBSCF films were grown on the electrolyte side of NiO+BZCYYb4411/BZCYYb4411 bi-layer cells using a PVD PLD/MBE 2300 in the Northwestern University PLD core facility. The substrate was heated at a rate of 30° C./min temperature, and the temperature was fixed at 650° C. for growth. The oxygen pressure in the chamber was set at 30 mTorr. The growth rate was found to be 20.8 nm min$^{-1}$ for the conditions employed (248 nm KrF laser, 270 mJ/pulse, 10 Hz repetition rate). Upon completion of the deposition, the chamber was vented to 300 Torr oxygen pressure, to facilitate oxidation of the film, and cooled at a rate of 10° C./min. As with the conventional cells, a slurry of PBSCF was then brush-painted (now onto the PBSCF thin film rather than the electrolyte) and the complete cell was sintered at 950° C. for 4 hours in air.

Fuel cell electrochemical characterization. Ag wires (GoodFellow) were attached at both electrodes of a single cell using an Ag paste (SPI supplies) as a current collector. An alumina tube and a ceramic adhesive (Ceramabond 552, Aremco) were employed to fix and seal the single cell. Humidified hydrogen (3% $H_2O$) was applied as fuel to the anode through a water bubbler with a flow rate of 60 sccm, and air was supplied to the cathode at a flow rate of 200 sccm during single cell tests. Impedance spectra were recorded under open circuit voltage (OCV) in a frequency range of 100 kHz to 0.1 Hz, with AC perturbation of 20 mV. I-V curves were collected using a BioLogic SP-300 Potentiostat at operating temperature from 500 to 650° C. in intervals of 50° C. The current stability was measured under a fixed voltage of 0.5 V at 550° C. The open circuit stability was measured for BZCYYb4411 and BZCYYb1711 electrolyte-based fuel cells with humidified (3% $H_2O$) 10% $CO_2$ and 90% $H_2$ mixture at 500° C. supplied to the anode and air to the cathode.

Microelectrode preparation and characterization. Electrochemical characterization was performed on an array of PBSCF microdots supported on a proton-conducting electrolyte substrate. Initial experiments in this work began with the electrolyte BZCYYb1711 and thus this material served as the substrate. A dense compact of BZCYYb1711 ~1.5 mm in thickness was prepared by the methods described above (solid state synthesis, final sintering at 1600° C. for 18 h). To provide a smooth surface for electrode deposition, a thin (~250 nm) buffer layer of $BaZr_{0.8}Y_{0.2}O_3$ was applied by a custom-made PLD/Laser-MBE System (Pascal Co., Ltd.) equipped with a loadlock chamber using a target prepared by a chemical solution method which is described in detail elsewhere. (See, e.g., Fabbri, E., et al., Tailoring the chemical stability of $Ba(Ce_{0.8-x}Zr_x)Y_{0.2}O_{3-\delta}$ protonic conductors for Intermediate Temperature Solid Oxide Fuel Cells (IT-SOFCs). *Solid State Ionics* 179, 558-564 (2008).) A KrF ($\lambda$=248 nm) excimer laser (Lambda COMPexPro) was used to ablate the targets at a pulse repetition rate of 5 Hz, a laser fluence of 0.51 J/cm$^2$, and a target-substrate distance of ~55 mm. Following the deposition of buffer layer, a thin film (~600 nm) of PBSCF was deposited on top using a target identical to the type used for PLD-modification of fuel cells. The growth rate of BZY and PBSCF was determined to be 2 nm min$^{-1}$ and 2.6 nm min$^{-1}$, respectively, for the following growth conditions: oxygen pressure: 30 mTorr for BZY, 100 mTorr for PBSCF; laser fluence on target: 0.51 J cm; laser power: 25 mJ; repeat rate: 5 Hz; substrate temperature: ~680° C. for BZY, ~640° C. for PBSCF. The grown film was then characterized by XRD (Bruker D8 Discover with 4 bounce monochromator, Cu K$\alpha$ radiation), optical microscopy (Keyence VW-9000), and atomic force microscopy (AFM, Digital Instruments Nanoscope and Dimension 5000). For electrochemical characterization, the film was patterned, using photolithography and ion milling, into a library of microelectrodes with diameters spanning from 125 to 500 μm. Specifically, each sample was coated with a photoresist (Shipley 1813) by a regular spin coating method (4000 rpm for 50 s). After spin coating, the photoresist was baked at 100° C. for 2 min to drive off solvents and solidify the film, following an exposure to UV radiation for 12 s through a photomask, and then developed in a Shipley 352 developer for 40 s. The sample then underwent ion milling for 90 min, resulting in a milling depth of 650 nm. In the final step, the residual photoresist was stripped using acetone. After the patterning, a circular microelectrode array with diameters of 125-500 μm was well defined on top of the BZCYYb1711. Impedance data were collected at a film temperature of 500° C. (pO$_2$=0.2 atm and pH$_2$O=0.016 atm) over the frequency range 1 MHz to 32 mHz using a voltage amplitude of 30 mV under zero-bias conditions (Solartron 1260). The data acquisition in an automated impedance microprobe instrument is described in detail elsewhere. (See, Usiskin, R. E., et al. Probing the reaction pathway in $(La_{0.8}Sr_{0.2})_{0.95}MnO_{3+\delta}$ using libraries of thin film microelectrodes. *Journal of Materials Chemistry A* 3, 19330-19345 (2015).)

Table 1. PCFCs for which peak power density approaches or exceeds 90 mWcm$^{-2}$ at 500° C. with air supplied to the cathode and humidified hydrogen to the anode. PPD=peak power density; OCV=open circuit voltage; $R_O$=area-specific ohmic resistance (measured/expected based on electrolyte thickness, assuming a conductivity at 500° C. of $1.5 \times 10^{-2}$ $\Omega^{-1}$cm$^{-1}$ for all electrolyte compositions); $R_P$=area-specific polarization resistance.

| Electrolyte | Anode | Cathode | PPD (Wcm$^{-2}$) | OCV (V) | $R_O$ ($\Omega$cm$^2$) | $R_P$ ($\Omega$cm$^2$) | Source |
|---|---|---|---|---|---|---|---|
| 100 nm BZY20 | Pt | Pt | >140$^a$ | 1.05 | n/a/$6.7 \times 10^{-2}$ | n/a | Shim, 2009 |
| 35 μm BaZr4Ce4Y2 | Ni + elyte | $Ba_{0.5}Sr_{0.5}Co_{0.8}Fe_{0.2}O_{3-\delta}$ | 115 | 1.07 | 1.5/0.23 | 0.4 | Guo, 2009 |
| 20 μm BZY10 | Ni-BZY20 | $PrBaCo_2O_{5+\delta}$ + BZPY10 | 92 | 1.01 | 1.53/0.13 | 1.18 | Bi, 2011 |

-continued

| Electrolyte | Anode | Cathode | PPD (Wcm$^{-2}$) | OCV (V) | R$_O$ (Ωcm$^2$) | R$_P$ (Ωcm$^2$) | Source |
|---|---|---|---|---|---|---|---|
| 20 μm BaZr1Ce7Y2 | Ni + elyte | Ba$_{0.5}$Sr$_{0.5}$FeO$_{3-\delta}$ + SDC | 95 | 1.08 | 0.6/0.13 | 3.7 | Sun, 2010 |
| 15 μm BaZr1Ce7Y1Yb1 | Ni + elyte | Ba$_{0.5}$Sr$_{0.5}$Fe$_{0.8}$Cu$_{0.2}$O$_{3-\delta}$ + SDC | 121 | 1.07 | 0.58/0.10 | 2.62 | Ling, 2011 |
| 12 μm BaZr1Ce7Y2 | Ni + elyte | La$_{0.7}$Sr$_{0.3}$FeO$_{3-\delta}$ + SDC | 175 | 1.09 | 0.76/0.080 | 1.5 | Sun, 2011 |
| 18 μm BaZr1Ce7Y2 | Ni + elyte | SSC (dry O$_2$ as oxidant) | 587 | 1.12 | 0.45/0.12 | 0.2 | Nien, 2011 |
| 40 μm BaZr1Ce7Y2 | Ni + elyte[b] | BaCo$_{0.7}$Fe$_{0.2}$Nd$_{0.1}$O$_{3-\delta}$ | 130 | 1.07 | n/a/0.27 | 1.8 | Lin, 2012 |
| 20 μm BaZr4Ce4Y2 | Ni + elyte | BSCFT + elyte | 95 | 1.07 | 1.4/0.13 | 1.7 | Bi, 2012 |
| 20 μm BaZr1Ce7Y2 | Ni + elyte | GBSC + elyte | 120 | 1.07 | 0.75/0.13 | 1.6 | Zhang, 2013 |
| 10 μm BaZr1Ce7Y1Yb1 | Ni + elyte | LSCF | 230 | 1.12 | 0.24/0.067 | 0.71 | Nguyen, 2013 |
| 15 μm BaZr1Ce7Y1Yb1 | Ni + elyte | NBSCF | ~150[c] | N/A | 0.24[¥]/0.10 | 1.4[¥] | Kim, 2014 |
| ~25 μm BaZr1Ce7Y1Yb1 + NiO | Ni + elyte | BaCo$_{0.4}$Fe$_{0.4}$Zr$_{0.1}$Y$_{0.1}$O$_{3-\delta}$ | 455 | 1.13 | n/a/0.17 | n/a | Duan, 2015 |
| ~25 μm BaZr3Ce6Y1 + CuO | Ni + elyte | BaCo$_{0.4}$Fe$_{0.4}$Zr$_{0.1}$Y$_{0.1}$O$_{3-\delta}$ | 318 | | n/a/0.17 | n/a | Duan, 2015 |
| ~25 μm BZY + NiO | Ni + elyte | BaCo$_{0.4}$Fe$_{0.4}$Zr$_{0.1}$Y$_{0.1}$O$_{3-\delta}$ | 335 | | n/a/0.17 | n/a | Duan, 2015 |
| ~2.5 μm BZY15 (PLD) | Ni + elyte | La$_{0.6}$Sr$_{0.4}$CoO$_{3-\delta}$ | 457 | 1.0 | 0.15/0.017 | 0.75 | Bae, 2017 |
| 15 μm 4411 (w/PLD)_1$^{st}$ cell | Ni + elyte | PBSCF | 528 | 1.12 | 0.18/0.10 | 0.55 | this work |
| 15 μm 4411 (w/PLD)_2$^{nd}$ cell | Ni + elyte | PBSCF | 548 | 1.09 | 0.15/0.10 | 0.58 | this work |
| 15 μm 4411 (no PLD)_1$^{st}$ cell | Ni + elyte | PBSCF | 377 | 1.05 | 0.29/0.10 | 0.74 | this work |
| 15 μm 4411 (no PLD)_2$^{nd}$ cell | Ni + elyte | PBSCF | 416 | 1.14 | 0.27/0.10 | 0.76 | this work |

BZY20 = BaZr$_{0.8}$Y$_{0.2}$O$_{3-\delta}$; BZY10 = BaZr$_{0.9}$Y$_{0.1}$O$_{3-\delta}$; BaZr4Ce4Y2 = BaZr$_{0.4}$Ce$_{0.4}$Y$_{0.2}$O$_{3-\delta}$; BZPY10 = BaZr$_{0.4}$Ce$_{0.4}$Y$_{0.2}$O$_{3-\delta}$; BaZr1Ce7Y1Yb1 = BaZr$_{0.1}$Ce$_{0.7}$Y$_{0.1}$Yb$_{0.1}$O$_{3-\delta}$; BaZr1Ce7Y2 = BaZr$_{0.1}$Ce$_{0.7}$Y$_{0.2}$O$_{3-\delta}$; SDC = samaria doped ceria (15-20 at %); SSC = Sm$_{0.5}$Sr$_{0.5}$CoO$_3$; BSCFT = Ba$_{0.5}$Sr$_{0.5}$(Co$_{0.8}$Fe$_{0.2}$)$_{0.9}$Ti$_{0.1}$O$_{3-\delta}$; GBSC = GdBa$_{0.5}$Sr$_{0.5}$Co$_2$O$_{5+\delta}$; LSCF = (La, Sr)(Co, Fe)O$_3$, precise composition not specified;
NBSCF = NdBa$_{0.5}$Sr$_{0.5}$Co$_{1.5}$FeO$_{5+\delta}$; PBSCF = PrBa$_{0.5}$Sr$_{0.5}$Co$_{1.5}$FeO$_{5+\delta}$;
elyte = electrolyte;
n/a = not available
[a]amorphous film, results at 400° C., current not sufficiently high to reach peak power density.
[b]material not reported, but is likely such a composite.
[c]extrapolated from measurements between 750 and 600° C.

REFERENCES FOR TABLE 1

Nguyen, N. T. Q., et al. Preparation and evaluation of BaZr$_{0.1}$Ce$_{0.7}$Y$_{0.1}$Yb$_{0.1}$O$_{3-d}$ (BZCYYb) electrolyte and BZCYYb-based solid oxide fuel cells. *J. Power Sources* 231, 213-218 (2013)

Duan, C. et al. Readily processed protonic ceramic fuel cells with high performance at low temperatures. *Science* 349, 1321-1326 (2015)

Nien, S. H., et al. Preparation of BaZr$_{0.1}$Ce$_{0.7}$Y$_{0.2}$O$_{3-\delta}$ Based Solid Oxide Fuel Cells with Anode Functional Layers by Tape Casting. *Fuel Cells* 11, 178-183 (2011)

Bae, K. et al. Demonstrating the potential of yttrium-doped barium zirconate electrolyte for high-performance fuel cells. *Nature Communications* 8, 14553 (2017)

Ling, Y, et al. A cobalt-free Sm$_{0.5}$Sr$_{0.5}$Fe$_{0.8}$Cu$_{0.2}$O$_{3-\delta}$—Ce$_{0.8}$Sm$_{0.2}$O$_{2-\delta}$ composite cathode for proton-conducting solid oxide fuel cells. *J. Power Sources* 196, 2631-2634 (2011).

Kim, J. et al. Triple-Conducting Layered Perovskites as Cathode Materials for Proton-Conducting Solid Oxide Fuel Cells. *ChemSusChem* 7, 2811-2815 (2014).

Shim, J. H., et al. Intermediate-Temperature Ceramic Fuel Cells with Thin Film Yttrium Doped Barium Zirconate Electrolytes. *Chem. Mater.* 21, 3290-3296 (2009).

Guo, Y, et al. Zirconium doping effect on the performance of proton-conducting BaZr$_y$Ce$_{0.8-y}$Y$_{0.2}$O$_{3-\delta}$ (0.0≤y≤0.8) for fuel cell applications. *J. Power Sources* 193, 400-407 (2009).

Bi, L., et al. A novel ionic diffusion strategy to fabricate high-performance anode-supported solid oxide fuel cells (SOFCs) with proton-conducting Y-doped BaZrO$_3$ films. *Energy Environ. Sci.* 4, 409-412, (2011).

Sun, W. et al. A high performance BaZr$_{0.1}$Ce$_{0.7}$Y$_{0.2}$O$_{3-\delta}$-based solid oxide fuel cell with a cobalt-free Ba$_{0.5}$Sr$_{0.5}$FeO$_{3-\delta}$—Ce$_{0.8}$Sm$_{0.2}$O$_{2-\delta}$ composite cathode. *Int. J. Hydrogen Energy* 35, 7925-7929 (2010).

Sun, W. et al. Optimization of BaZr$_{0.1}$Ce$_{0.7}$Y$_{0.2}$O$_{3-\delta}$-based proton-conducting solid oxide fuel cells with a cobalt-free proton-blocking La$_{0.7}$Sr$_{0.3}$FeO$_{3-\delta}$—Ce$_{0.8}$Sm$_{0.2}$O$_{2-\delta}$ composite cathode. *Int. J. Hydrogen Energy* 36, 9956-9966 (2011).

Lin, Y, et al Characterization and evaluation of BaCo$_{0.7}$Fe$_{0.2}$Nb$_{0.1}$O$_{3-\delta}$ as a cathode for proton-conducting solid oxide fuel cells. *Int. J. Hydrogen Energy* 37, 484-497 (2012).

Bi, L., et al. Effect of anode functional layer on the performance of proton-conducting solid oxide fuel cells (SOFCs). *Electrochem. Commun.* 16, 37-40 (2012).

Zhang, X. et al. A highly active anode functional layer for solid oxide fuel cells based on proton-conducting electrolyte BaZr$_{0.1}$Ce$_{0.7}$Y$_{0.2}$O$_{3-\delta}$. *J. Power Sources* 241, 654-659 (2013).

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method of forming a bilayer cathode, the method comprising:
   forming a dense proton permeable interlayer of a proton permeable cathode material on a solid proton conducting electrolyte by depositing a film of the cathode material via a vapor deposition process;

forming a porous overlayer of the proton permeable cathode material on the dense proton permeable interlayer, wherein the porous overlayer has a higher porosity than the dense proton permeable interlayer and;

sintering the dense proton permeable interlayer and the porous overlayer.

2. The method of claim 1, wherein the vapor deposition process is pulsed laser deposition.

3. The method of claim 2, wherein the proton permeable cathode material is a proton permeable strontium cobalt perovskite.

4. The method of claim 3, wherein the proton permeable cathode material is $PrBa_{0.5}Sr_{0.5}CO_{2-x}Fe_xO$ 5+δ, where $0.4 \leq x \leq 2$.

5. The method of claim 2, wherein forming the porous overlayer of the proton permeable cathode material on the interlayer comprises depositing a slurry comprising the cathode material on the dense proton permeable interlayer.

6. The method of claim 2, wherein the dense proton permeable interlayer has a thickness of no greater than 500 nm and the porous overlayer has a thickness of at least 1 μm.

7. The method of claim 6, wherein forming the porous overlayer of the proton permeable cathode material on the interlayer comprises depositing a slurry comprising the cathode material on the dense proton permeable interlayer.

8. The method of claim 7, wherein the proton permeable cathode material is a proton permeable strontium cobalt perovskite.

9. The method of claim 8, wherein the proton permeable cathode material is $PrBa_{0.5}Sr_{0.5}CO_{2-x}FexO$ 5+δ, where $0.4 \leq x \leq 2$.

10. The method of claim 9, wherein the dense proton permeable interlayer has a thickness of no greater than 100 nm and the porous overlayer has a thickness of at least 10 μm.

11. The method of claim 2, wherein the dense proton permeable interlayer has a thickness of no greater than 100 nm and the porous overlayer has a thickness of at least 10 μm.

* * * * *